(12) United States Patent
Ilbery et al.

(10) Patent No.: US 6,476,934 B1
(45) Date of Patent: Nov. 5, 2002

(54) GEOMETRICALLY REDUCING INFLUENCE HALFTONING

(75) Inventors: Peter William Mitchell Ilbery; Michael Richard Arnold, both of New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/111,181

(22) Filed: Jul. 8, 1998

Related U.S. Application Data

(63) Continuation-in-part of application No. 08/779,009, filed on Jan. 2, 1997, now Pat. No. 6,124,844.

(30) Foreign Application Priority Data

Jul. 9, 1997 (AU) ............................................. 7813/97

(51) Int. Cl.⁷ ......................... H04N 1/405; G06K 15/02
(52) U.S. Cl. ....................... 358/3.04; 382/252; 345/616
(58) Field of Search ....................... 358/1.9, 456, 458, 358/298, 3.04, 3.03, 3.05; 382/252; 345/616

(56) References Cited

U.S. PATENT DOCUMENTS 4,339,774 A    7/1982  Temple
6,108,452 A *  8/2000  Ilbery ........................... 382/252
6,124,844 A *  9/2000  Ilbery ........................... 382/252

* cited by examiner

Primary Examiner—Scott Rogers
(74) Attorney, Agent, or Firm—Fitzpatrick, Cella, Harper & Scinto

(57) ABSTRACT

Methods and apparatus for processing an image is disclosed. First an output value of a first current pixel ($in_{x,y-1}$), which is not at an edge of the image, is determined using a first influence value ($W_{x,y-2}$) for a first current pixel which equals a first sum, over a first set of pixels, of the product of a pixel weight value and a corresponding pixel value, where the pixel weight value is substantially equal to a weight factor (X, Z) raised to the power (i) of the distance of the pixel from the first current pixel. An output value for a second current pixel ($in_{x,y}$), is determined using a second influence value ($W_{x,y-1}$) determined as either a product of a weight value reducing factor (X) and the first influence value, or a product of weight value reducing factor and the sum of the first influence value and a value for the first current pixel, where the second influence value equals a second sum over a second set of pixels of the product of a pixel weight value and a corresponding pixel value, and where each pixel weight value is substantially equal to a weight factor raised to the power of the distance of the pixel from the second current pixel.

79 Claims, 17 Drawing Sheets

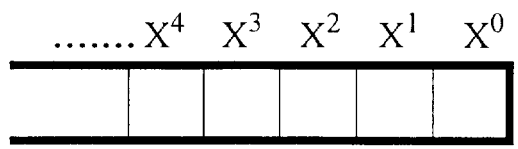
Fig. 1A
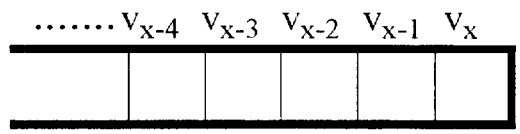
Fig. 1B
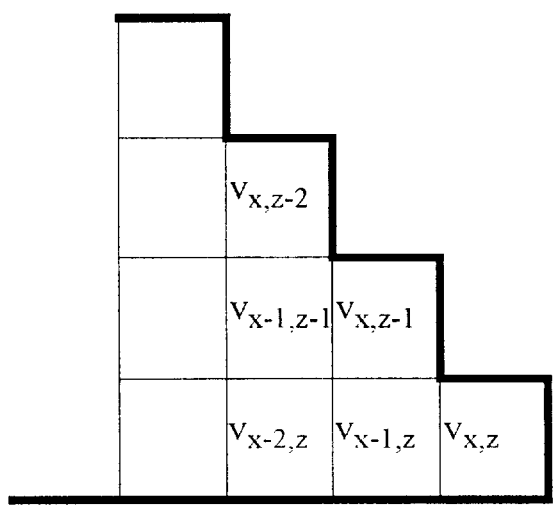
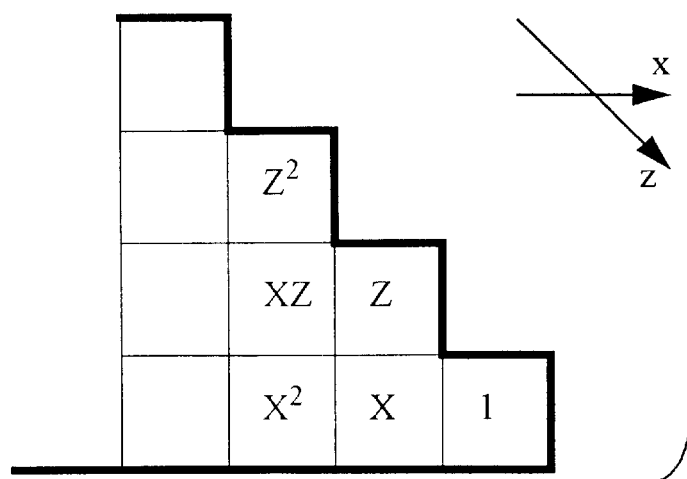
Fig. 2

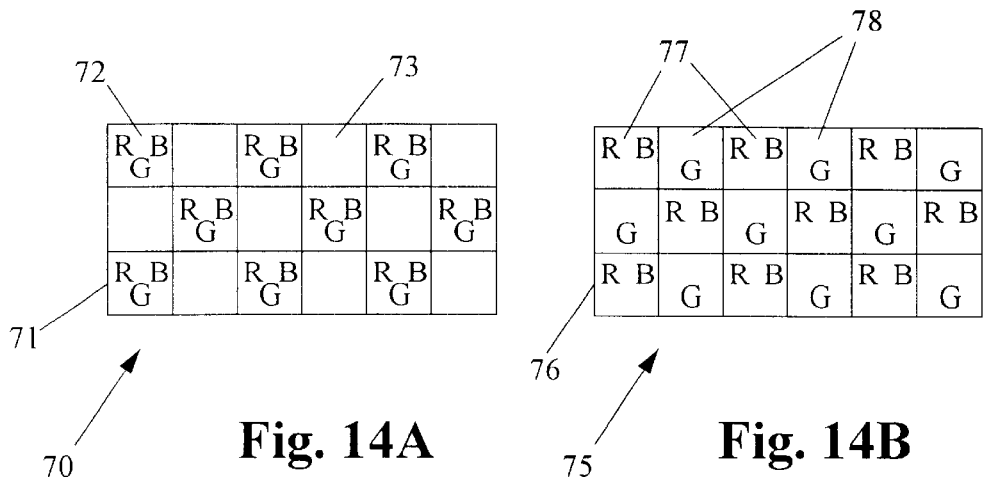
Fig. 14A
Fig. 14B
0.0.1
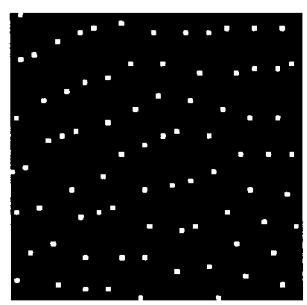
Fig. 15A
0.0.2
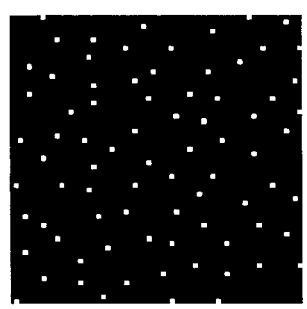
Fig. 15B
0.0.3
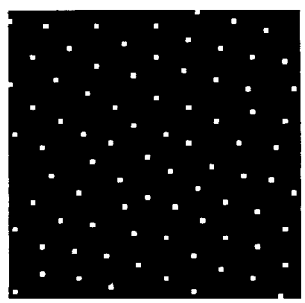
Fig. 15C

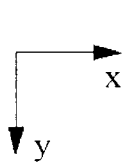
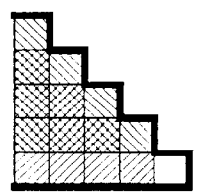
Fig. 19A
WBbl$_{x,y}$
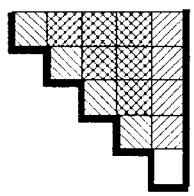
Fig. 19B
WBtl$_{x,y}$
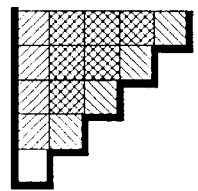
Fig. 19C
WBtr$_{x,y}$
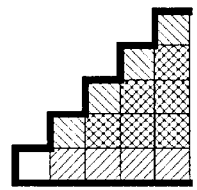
Fig. 19D
WBbr$_{x,y}$
Fig. 20
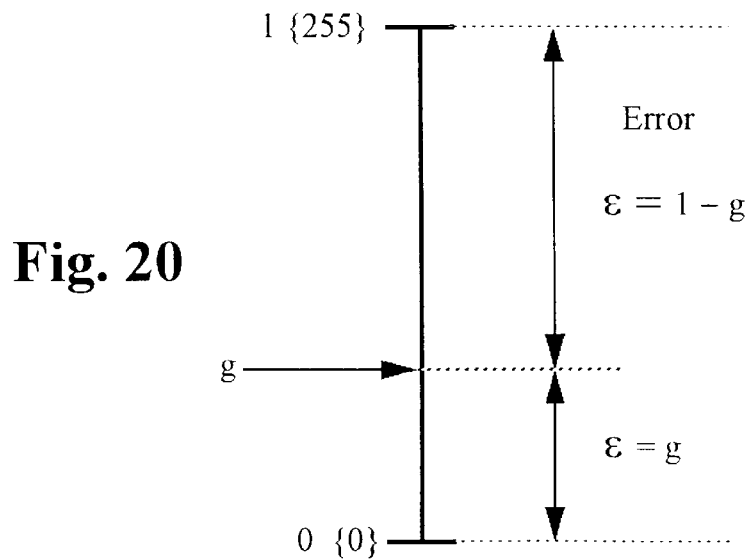

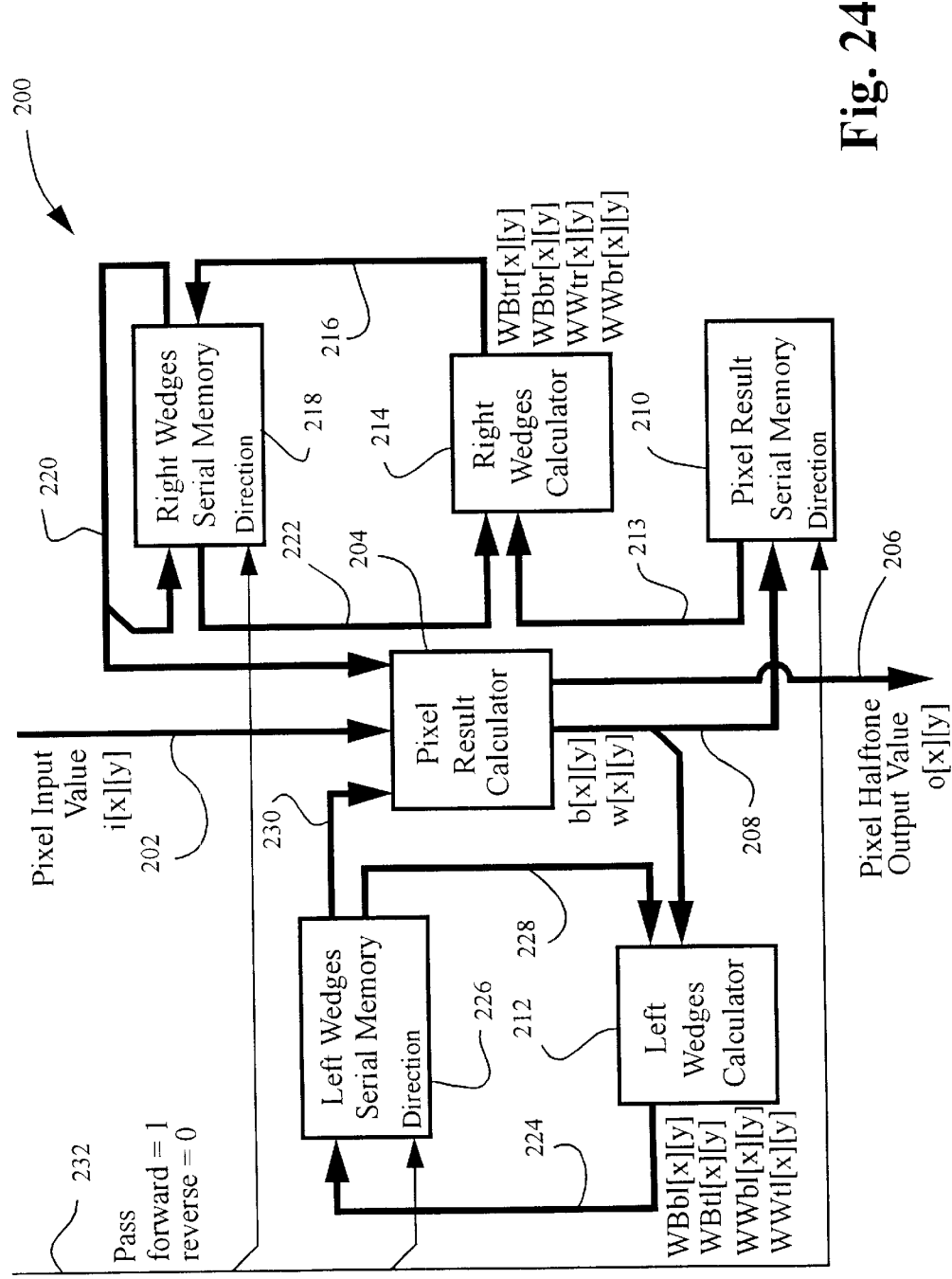

GEOMETRICALLY REDUCING INFLUENCE HALFTONING

CROSS-REFERENCE TO RELATED APPLICATION

The present application is a Continuation-in-Part of U.S. patent application Ser. No. 08/779,009 filed Jan. 2, 1997 file in the name of Peter William Mitchell Ilbery and assigned to Canon Kabushiki Kaisha, now U.S. Pat. No. 6,124,844.

FIELD OF INVENTION

The present invention relates generally to digital image processing and, in particular, to methods and apparatus for the digital halftoning of continuous tone images.

BACKGROUND ART

Digital halftoning is a technique used in image processing to produce a halftone output image from a continuous tone input image. In order to halftone a digital color image, a continuous tone color image is sampled, for example with a scanner, and the samples are then digitised and stored in a computer device. In a full color system, the digitised samples, or pixels, can consist of independent binary representation of the color components of an image. For example, in the well known red, green and blue system (RGB), utilised in most output displays, the digitised samples or pixels consist of binary representations of the red, green and blue scanned color values respectively. These binary representations typically range from 0 to 255 for each color, thereby comprising 8 bits for each primary color, or 24 bits to represent one pixel. Another color system involves cyan, magenta, yellow and black (CMYK) and is used predominantly in printer output devices.

Standard cathode ray tube (CRT) type display devices are able to display each pixel with a large number of variations of each color component of the pixel, giving rise to the desirability of storing 256 possible values for each color component of each pixel of a CRT type display. Other output devices however, such as printers and certain display devices such as ferro-electric liquid crystal displays are often designed to only be able to display a limited number of colors or intensity values for each output color, Hence, when displaying an image on such devices, it is necessary to create the sensation of multilevel colors by suitably distributing the possible output colors in the output image. By way of example, it can be assumed that each pixel of a first example display device is able to display red, green and blue color values (RGB), with each color value taking either one of a totally on or totally off state. Therefore, each color component value can display one of two colors and the total number of colors which can be displayed by such a pixel will be 2×2×2=8 colors.

Two well known methods of halftoning are error diffusion and dithering. To describe error diffusion and dithering, consider by way of example, a monochrome display system where each pixel of an array of pixels can display either black or white. Assume the input image has 256 possible levels of display or values, 0 through 255. A decision must be taken for each pixel whether to display an "off" value of 0 or "on" value of 255.

In error diffusion for this example system, an "off" value is displayed at a current pixel when the input value at the pixel plus error values transferred to the pixel is less than or equal to 127, and an "on" value is displayed when the input value plus error values transferred to the pixel are greater than or equal to 128. An error value at the current pixel is derived, being the input value at the pixel plus the error values transferred to the pixel less the chosen output value, Portions of this error value are then transferred to surrounding pixels which have not, as yet, been output, in accordance with a known distribution mask, This has the effect of spreading, or "diffusing" the error over several pixels in the output image.

FIG. 25A illustrates a known error diffusion mark, where a current pixel 400 is being processed and the error value at the current pixel 400 is distributed to a limited set of neighbouring pixels 401 to 406 according to values provided by the mask. In this example, 2/8 of the error is distributed to the pixel 401 and 1/8 of the error distributed to the pixel 402, and so on.

With such arrangements, halftoning by error diffusion typically proceeds by processing pixels in raster order in the manner shown in FIG. 25B. There, a first current pixel output value is decided using an input sum for the first current pixel, in particular, a sum of the input value for the first current pixel with a weighted sum of error values of previously processed pixels. After the first current pixel output value is determined, an output sum for the first current pixel is calculated as an input sum less the current pixel output value. Note that the output sum is a weighted sum of error values of processed pixels including the first current pixel, where the error value for the first current pixel is its input value less its output value, and the weight for the first current pixel is one. The output sum is then divided into portions which are distributed to a small group of close neighbouring unprocessed pixels. That is, each portion is added to the input sum of a neighbouring unprocessed pixel. In this way, the input sum for a second current pixel is calculated as the sum of the input value for the second current pixel plus a weighted sum of error values of previously processed pixels, and the processing applied to the first current pixel can be repeated for the second current pixel.

As such, error diffusion is a neighbourhood process halftoning technique. Expressed in another way, error diffusion provides a halftone output at a pixel that depends on the halftone output of pixels in its neighbourhood. In conventional error diffusion, the error between a halftoned output value and the input value for any one pixel is typically spread amongst a neighbourhood comprising a limited number of pixels, six (6) as seen in the above example. It follows therefore that the output value of a pixel is predominantly determined by the influence of a small neighbourhood of pixels associated therewith.

It has been found that error diffusion produces-unsatisfactory results when an input image comprises video or other forms of data having motion (ie. dynamic images) or noise characteristics. When dynamic images or images having a certain associated noise therein are error diffused, the error diffusion process is subject to slight variations from one frame to the next which in turn results in pixel values begin turned "on" and "off" at a detectable and distracting rate. This problem can be variously described as "sparkling noise", "dancing dots" and "twinkling", as the effect is to produce an area having rapidly changing individual pixel values but having a substantially constant overall color. This problem applies equally to both monochrome and full color display output devices in which such images are displayed.

Further, regions of low and high intensity are typically handled poorly by traditional error diffusion. This problem may also occur in both still and moving images.

The halftoning process of dithering traditionally involves the creation of "dither matrix", where the input value of a current pixel is compared with a corresponding value in the dither matrix and an output value for the current pixel is derived, For example, if the dither matrix value is less than the input value of the current pixel, the display device, such as a printer or display, produces an "on" value at the current pixel.

A dither matrix is preferably constructed having certain characteristics which improve the appearance of output halftoned images. These characteristics include arrangement of dither matrix values so that resulting "on" or "off" pixel values are as spread out as possible.

The process of dithering dynamic images, that is, dithering images forming part of an image sequence, however results in the reproduction of images have a noisy, "mottled" appearance in regions having a substantially constant color. Another disadvantage of dithering includes poor edge sharpness at the edges of graphical objects forming part of the image.

It is an object of the present invention to provide an alternative form of image processing which leads to improved output values for display.

SUMMARY OF THE INVENTION

In accordance with one aspect of the present invention there is disclosed a method of processing an image, said image comprising a plurality of pixels, said method comprising the steps of:

(a) determining an output value of a first current pixel, which is not at an edge of the image, using a first influence value for a first current pixel which equals a first sum, over a first set of pixels, of the product of a pixel weight value and a corresponding pixel value, where the pixel weight value is substantially equal to an weight factor raised to the power of the distance of the pixel from the first current pixel; and (b) determining an output value for a second current pixel, using a second influence value determined as either:
  (i) a product of a weight value reducing factor and the first influence value, or
  (ii) a product of a weight value reducing factor and the sum of the first influence value and a value for the first current pixel,
  so that the second influence value equals a second sum over a second set of pixels of the product of a pixel weight value and a corresponding pixel value, where each pixel weight value is substantially equal to a weight factor raised w the power of the distance of the pixel from the second current pixel.

In accordance with another aspect of the present invention there is disclosed a method of halftoning an image, said image comprising a plurality of pixels each having an input value and an assignable output value that can take on one of at least two output values, said method comprising the steps of:

(a) determining an output value of a first current pixel, which is not at an edge of the image, using a first influence value for a first current pixel: which equals a first sum, over a first set of pixels, of the product of a pixel weight value and a corresponding pixel error value, where the pixel weight value is substantially equal to a weight factor raised to the power of the distance of the pixel from the first current pixel; and (b) for the purpose of determining an output value for a second current pixel, calculating a second influence value for the second current pixel
  (i) as a product of a weight value reducing factor and the first influence value, or
  (ii) as a product of a weight value reducing factor and the sum of the first influence value and an error value for the first current pixel,
  so that the second influence value equals a second sum over a second set of pixels of the product of a pixel weight value and a corresponding pixel error value, where the pixel weight value is substantially equal to a weight factor raised to the power of the distance of the pixel of the second set from the second current pixel.

In accordance with another aspect of the present invention there is disclosed a method of halftoning an image, said image comprising a plurality of pixels each having an input value and an assignable output value that can take on one of at least two output values, said method comprising the steps of;

(a) determining an output value of a first current pixel, which is not at an edge of the image, using a set of two or more first influence values for a first current pixel where each first influence value equals a sum, over a first set of pixels, of the product of a pixel weight value and a corresponding pixel error value, where the pixel weight value is substantially equal to a weight factor raised to the power of the distance of the pixel from the first current pixel; and (b) for the purpose of determining an output value for a second current pixel, calculating a set of two or more second influence values for the second current pixel where each second influence value is calculated
  (i) as a product of a weight value reducing factor and one of the first influence values, or
  (ii) as a product of a weight value reducing factor and the sum of one of the influences value and an error value for the first current pixel,
  so that each second influence value equals a sum over a second set of pixels of the product of a pixel weight value and a corresponding pixel error value, where the pixel weight value is substantially equal to a weight factor raised to the power of the distance of the pixel of the second set from the second current pixel.

Many other aspects of the invention, including apparatus and systems are also disclosed The present invention provides a foundation for a class of neighbourhood process halftoning methods which gather the results of halftoning from a wide neighbourhood of a current pixel, in an efficient and accurate manner.

Because these methods accurately represent the influence (or error) of halftone results in a wide neighbourbood, they exhibit improved halftone patterns in regions of low or high intensity, particularly compared to error diffusion, In such regions, an accurate value for the influence of comparatively rare exceptional valued halftone output (that is, halftone output with large error) is required.

The class of halftoning methods described herein implement a scheme for the influence of halftone output at one pixel location, on the halftone output at another location, which is described as a "geometrically reducing influence". Notably, the influence of the halftone output at one, already determined pixel, on a second, as yet undetermined pixel, reduces with the distance between the two pixels. It has been found that the rate of decrease in influence with distance can successfully be modelled, at least for substantial distances, as a geometrically reducing influence—that is, as an exponentially decreasing influence.

In the class of methods described herein, the geometrically reducing influence is implemented by representing the influence of the halftone output at a processed pixel on a neighbouring, as yet, unprocessed pixel, as a product of the error at the processed pixel with a weight value which equals or equals approximately, a weight factor raised to the power of the distance between the processed pixel and the unprocessed pixel.

With this representation of influence, the combined influence of previously processed pixels on a current pixel can be summarised using a small number of values either comprising or including "influence running sums". An influence running sum (or for brevity a "running sum") is a single value summarising the influence of a set of pixels substantially oriented in one direction from a current pixel. Once the current pixel has been determined, new running sums for use in processing subsequent pixels can be calculated efficiently using previously calculated running sums and the error at the current pixel.

This recursive calculation of running sums depends on the geometrically reducing nature of the weight values. Running sums and their recursive calculation are the mechanism for delivering the efficient and accurate representation of neighbourhood halftone influence.

In accordance with a another aspect of the present invention, there is provided a method of halftoning an image, said image comprising a plurality of pixels each having an input value and an assignable output value that can take on one of at least two output values, said method comprising, for a current pixel of said image, the steps of:

(a) determining an under result and an over result for a plurality of previously halftoned pixels of said image;

(b) determining using the under result and the over result of previously halftoned pixels an under result repulsive measure and an over result repulsive measure for the current pixel;

(c) comparing the under result repulsive measure to the over result repulsive measure; and (d) assigning a first output state value as the output value for the current pixel in the event that the under result repulsive measure is greater than the over result repulsive measure, and assigning a second output state value as the output value for said current pixel in the event that the over result repulsive measure is greater than the under result repulsive measure.

In accordance with another aspect of the present invention, there is provided a method of one or more images, each image comprising pixels, said method comprising, for each pixel of a current image, the steps of:

(a) assigning a predetermined value to an output value of the pixel, (b) determining using the predetermined output value of the pixel a repulsive measure between the pixel and a plurality of previously halftoned pixels of the current image;

(c) comparing the repulsive measure to the minimum repulsive measure achievable for the pixel in combination with a threshold value; and (d) retaining the predetermined value as the output value of said pixel if the repulsive measure is less than the sum of the minimum repulsive measure and the threshold value.

Apparatus for performing each of the above aspects is also disclosed.

In accordance with a another aspect of the present invention, there is provided a computer software system for executing instructions on a general purpose computer, wherein said instructions comprise a plurality of process modules for halftoning an image, said image comprising a plurality of pixels each having an input value and an assignable output value that can take on one of at least two output values, said modules comprising:

a first determining module for determining an under result and an over result for a plurality of previously halftoned pixels of said image;

a second determining module for determining using the under result and the over result an under result repulsive measure and an over result repulsive measure for the current pixel:

a comparing module for comparing the under result repulsive measure to the over result repulsive measure; and an assigning module for assigning a first output state value as the output value for the current pixel in the event that the under result repulsive measure is greater than the over result repulsive measure, and assigning a second output state value as the output value for said current pixel in the event that the over result repulsive measure is greater than the under result repulsive measure.

In accordance with a another aspect of the present invention, there is provided a computer software system for executing instructions on a general purpose computer, wherein said instructions comprise a plurality of process modules for halftoning one or more images, each image comprising a plurality of pixels, said modules comprising:

an assigning module for assigning a predetermined value to an output value of the pixel, a determining module for determining a repulsive measure between the pixel and a plurality of previously halftoned pixels of the current image;

a comparing module for comparing the repulsive measure to the minimum repulsive measure achievable for the pixel in combination with a threshold value; and a decision module for retaining the predetermined value as the output value of said pixel if the repulsive measure is less than the sum of the minimum repulsive measure and threshold value.

In accordance with a another aspect of the present invention, there is provided a computer system comprising:

input means for receiving an image or a sequence of images;

halftoning means for halftoning said image(s), said halftoning being characterised by a determination of the relative repulsive forces between a current pixel of the image(s) being halftoned, and a plurality of previous pixels of the image(s) that have been halftoned; and a discrete level display for displaying the image(s) output from said halftoning means.

In accordance with a another aspect of the present invention, there is provided an image processor comprising:

input means for receiving pixel data of an image to be displayed;

means for determining repulsive measure data from repulsive forces between said pixel data and a plurality of previously halftoned pixels; and pixel calculator means for determining halftone output data of said image processor from said pixel data and said repulsive measure data.

In accordance with a another aspect of the present invention, there is provided a method of halftoning an image, said image comprising a plurality of pixels, said method being characterised by the determination of repulsive forces between a current pixel of the image being halftoned, and a plurality of previous pixels of the image that have been halftoned.

The present inventor has named this alternative type of halftoning, Force Field Halftoning, as it relies upon relative color forces acting on a pixel.

BRIEF DESCRIPTION OF THE DRAWINGS

A number of embodiments of hew present invention will now be described with reference to of the drawings and Appendices, in which:

FIGS. 1A and 1B depict an arrangement of 1-dimensional weighted sum with geometrically reducing weights;

FIG. 2 depicts a 2-dimensional weighted sum with geometrically reducing weights;

FIGS. 14A and 14B respectively illustrate the effects of standard dithering and anti-correlated dithering;

FIGS. 15A, 15B and 15C comparatively illustrate the halftoning effects of error diffusion, dithering and force field halftoning respectively;

FIGS. 19A to 19D depict the wedge calculations for the embodiment of FIG. 16;

FIG. 20 depicts the errors produced in image halftoning for an arbitrary input value;

FIG. 24 is a schematic block diagram representation of a force field halftoning processor according to one embodiment;

Figure 3:
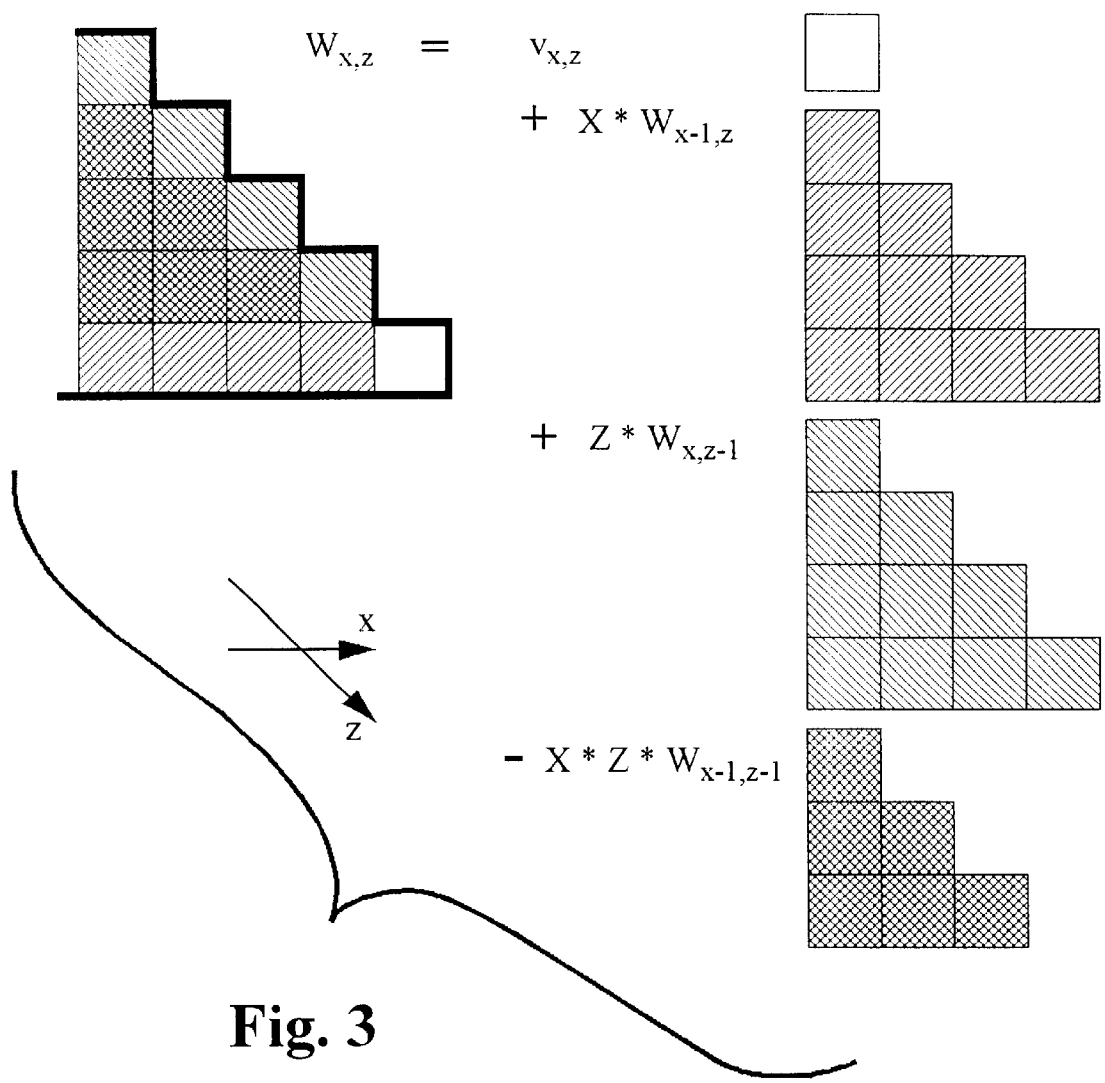
FIG. 3 illustrates the recursive calculation of a wedge sum.

Appendix A is a program listing in "C" for implementing an embodiment of the invention; and Appendix B lists error values called with the program of Appendix A;

Appendix C is a listing of an inverse force field map used for a software implementation of one embodiment;

Appendix D is a source code listing for a software implementation of a 2 level force filed halftoning process that uses the map of Appendix C; and Appendix E provides a number of pseudo-code listings that depict the function and operation of the force field processor of FIG. 24.

DETAILED DESCRIPTION OF THE PREFERRED EMBODIMENTS

As an introduction, one-dimensional weighted sums with geometrically reducing weights are described. FIG. 1A shows a sequence of geometrically reducing weights $X^i$ and FIG. 1B shows a sequence of values $v_j$. The sequences are shown extending to the left, to accord with usual raster processing of an image from left to right. For example, in FIG. 1A, with X=½, the weight values are 1/16, 1/8, ¼, ½, and 1.

A 1-dimensional "running sum" or line sum $L_x$ is the sum of products of weights and values having a product pair for each location in the sequence. A formula for this may be expressed as:

$$L_x = \Sum_{i>=0} X^i * v_{x-i}.$$

This may also be expressed as a formula for the recursive calculation of a line sum $L_x$ from another line sum $L_{x-1}$, that is:

$$L_x = v_x + X * L_{x-1}.$$

It is to be noted therefore that the calculation of $L_x$ using $L_{x-1}$ is a simple matter, particularly if the weight reducing factor, X, has a convenient value such as ½.

Weighted sums with geometrically reducing weights for two dimensions can also be described. One way of defining a 2-dimensional weighted sum with geometrically reducing weights is the following definition of a "wedge sum", illustrated in FIG. 2.

Consider therefore an array of values, shown in FIG. 2, where each value corresponds to a pixel position in a wedge of pixel positions extending to an arbitrary distance back from the apex of the wedge. Further, also consider an array of coefficients of weight values, also shown in FIG. 2, where each weight value corresponds to a pixel position in the same wedge of pixel positions, and where each weight value is determined by its pixel position and by two factors, X, Z. Then define a wedge sum of values, or simply a "wedge sum", as being the sum of a term for each pixel position in the wedge of pixel positions, where each term is the product of the weight value for the pixel position and the value for the pixel position.

A wedge sum with apex at location (x,z) in 2-dimensional space can therefore be expressed as:

$$W_{x,z} = \Sum_{i>=0, j>=0}(v_{x-i, z-j} * X^i * Z^j)$$

If the factor Z is chosen appropriately, namely if Z is equal to $X^{\sqrt{2}}$ (that is, X raised to the power of the square root of 2), then for all pixels along the 2 sides of the wedge, the weight value for a pixel can be expressed as $X^d$ where d is the distance from the centre of the pixel to the centre of the apex pixel.

For other pixels within the wedge, with the same choice of Z, the weight value for a pixel is approximately equal to $X^d$ where d is the distance from the centre of the pixel to the centre of the apex pixel.

Two dimensional wedge sums can also be calculated in a recursive fashion. For example, $W_{x,z}$ can be calculated in terms of $W_{x-1,z}$ and $W_{x,z-1}$ and $W_{x-1,z-1}$. Namely:

$$W_{x,z}=v_{x,z}+X*W_{x-1,z}+Z*W_{x,z-1}-X*Z*W_{x-1,z-1}$$

This can be seen with the assistance of FIG. 3.

Figure 4:
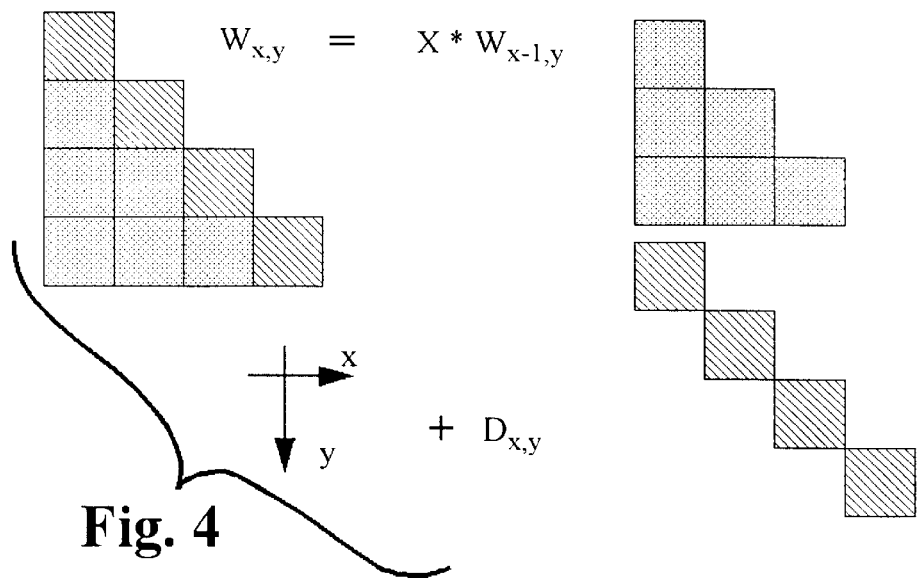
FIG. 4 shows the calculation of a wedge sum from a wedge sum and a diagonal line sum.

A wedge sum can also be calculated recursively using a previously calculated wedge sum and a diagonal line sum as shown in FIG. 4. Note that in FIG. 4, pixel positions are now specified in displacements along the conventional x and y axes.

Figure 5:
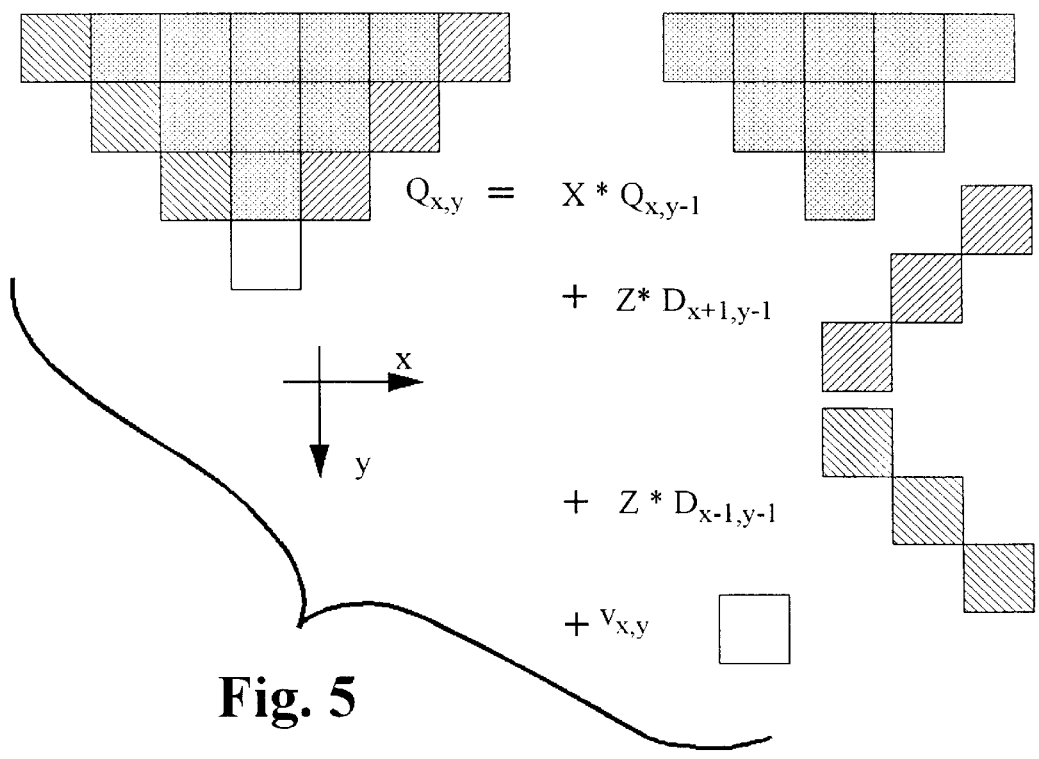
FIG. 5 shows a similar calculation of a quadrant sum using a quadrant sum and two diagonal line sums.

Also, a sum of two wedge sums minus a line sum, can be considered as a "quadrant sum", being a sum of products for a quadrant of pixels. A quadrant sum, $Q_{x,y}$, with apex pixel at the location (x,y), can be calculated recursively using a previously calculated quadrant sum and two diagonal line sums as shown in FIG. 5. Once again, in FIG. 5 pixel positions are specified in displacements along the conventional x and y axes.

For halftoning, where each pixel is determined once in raster order, a preferred method of calculating the influence of processed pixels on a current pixel is now described. In this preferred method, all processed pixels contribute to the influence of processed pixels on a current pixel; and all processed pixels are grouped into disjoint collections or sets of pixels, shown in FIG. 6, with a running sum being used to summarise the influence of each set of pixels. Alternatively, running sums may be used to summarise the influence of a proper subset of all processed pixels.

Figure 6:
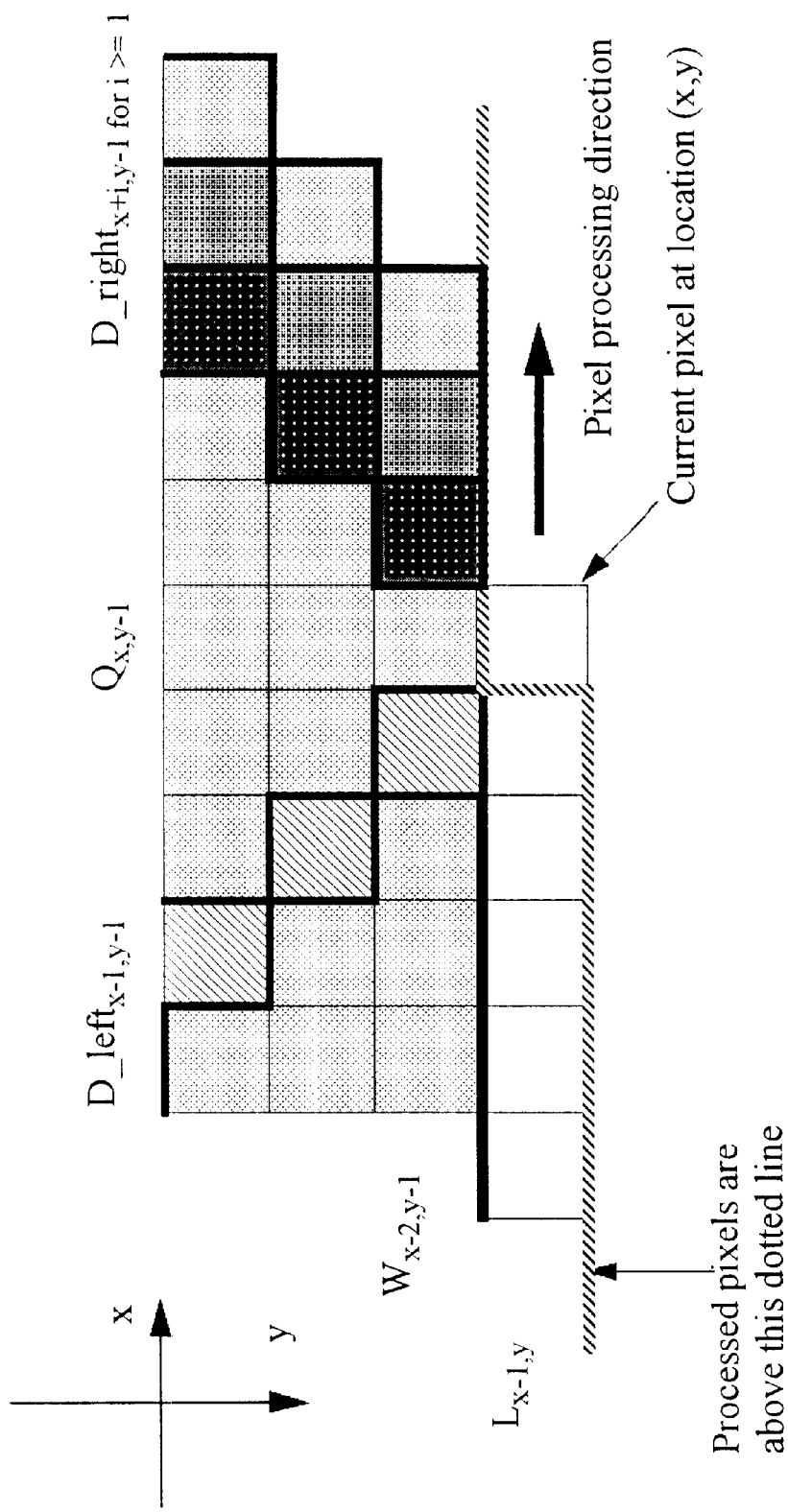
FIG. 6 illustrates the influence of previously processed pixels on current pixel for raster processing order.

In FIG. 6, raster processing order is assumed, where each row of pixels is processed one at a time from left to right and each row is processed one at a time from the top to the bottom of the image. The influence on a current pixel at location (x,y) is the sum of the influence of each pixel already processed; that is of each pixel above the dotted line.

The influence of a processed pixel on a current pixel is expressed as the product of a value representing the error at the current pixel with a weight value for the processed pixel. The weight value for a processed pixel can be represented as a weight factor, X, raised to the power of the distance of the processed pixel from the current pixel. A weight factor of X equal to ½ has been found to provide good halftone results and allows efficient implementation in software and hardware.

A suitable error value for a processed pixel is provided by:

$$error_{pixel}=input\_value_{pixel}-output\_value_{pixel}$$

The total influence of all processed pixels on a current pixel can then be expressed as shown in FIG. 6 as a sum of:

- a horizontal line sum, $L_{x-1,y}$ extending to the left of the current pixel;
- a wedge sum, $W_{x-2,y-1}$ with apex at pixel location (x-2, y-1);
- a diagonal line sum. $D\_left_{x-1,y-1}$ extending to the top left;
- a quadrant sum, $Q_{x,y-1}$ with apex at pixel location (x,y-1) extending upwards; and
- a sequence of diagonal line sums, $D\_right_{x+i,y-1}$ extending to the top right.

As a formula, the total influence of all processed pixels on a current pixel is given by:

$$error\_contribution\_of\_processed\_pixels_{current\_pixel}=X*L_{x-1,y}+X*Z*W_{x-2,y-1}+Z*D\_left_{x-1,y-1}+X*Q_{x,y-1}+Z*(\Sigma_{i>=1}X^i*D\_right_{x+i,y-1}).$$

Note that in practice, sufficient approximation to the total influence on a current pixel is obtained by using a limited number (for bi-level halftoning of 8-bit input values, 3 to 5 is typically sufficient) of diagonal line sums extending to the top right.

Note that with the above computation of the contribution of error of processed pixels, the weight for each processed pixel is approximately X to the power of the distance of the pixel from the current pixel.

An alternative to the preferred method described above is to adjust the contribution of the error of pixels near to the current pixel, so that the resulting weight for the error of nearby pixels no longer approximates a common weight factor raised to a power of the distance of the pixel from the current pixel.

Such an alternative allows flexibility to achieve different halftoning effects while maintaining the efficient and accurate method of running sums with geometrically reducing weight values to gather influence over a wide neighbourhood of processed pixels.

Further, running sums may also be used to efficiently and accurately gather the influence of processed pixels when pixels are processed in other than raster order and when pixels are processed more than once and when the halftone output for more than one pixel is decided at a time.

Given the error contribution, various schemes may be used for determining the halftone output of a current pixel based upon the influence of previously processed pixels.

Method 1: "Filtered Error Minimisation"

Chose that halftone output for the current pixel which minimises the absolute value of the filtered error at the current pixel, where the filtered error at the current pixel is expressed as:

$$filtered\_error_{current\_pixel}=error_{current\_pixel}*weight_{current}+error\_contribution\_of\_processed\_pixels_{current\_pixel}.$$

The value $weight_{current}$ is typically chosen to be unity (1), but can be altered to achieve a desired blurring or sharpening of the halftone image, where a higher value will sharpen the halftone image and a lower value will blur the halftone image.

Method 2: "Force Field Halftoning"

This method involves choosing that halftone output for the current pixel which minimises the product of the error at the current pixel with a weighted sum of errors of processed pixels which have the same sign as the error at the current pixel. With this method of determining the halftone output of a current pixel, separate running sums must be maintained for positive and negative signed errors. Various methods of force field halftoning ("FFH") are discussed below.

Methods 1 and 2 above are examples of "cost minimisation" halftoning. That is, that halftone output for the current pixel is chosen which mininmises a cost function of the halftone output value. In the case of filtered error minimisation, the cost function or cost measure is the absolute value of the error at the current pixel. In the case of force field halftoning, the cost function or cost measure is the product of the error at the current pixel with a weighted sum of errors of processed pixels which have the same sign as the error at the current pixel.

Method 3. "Cost Minimisation Mixed with Other Halftoning"

This method involves, for the current pixel, calculating the cost measure for the halftone output for the current pixel provided by another method of halftoning, for example, dither halftoning. Alternatively error diffusion may be used. If the cost measure is less than the minimum cost measure for any halftone output for the current pixel plus a threshold, then the dither halftone output is chosen, otherwise the halftone output which mininmises the cost measure is chosen for display.

Mixing with dither halftoning, where a large dither matrix is used, is a convenient method of introducing a desirable appearance of randomness into halftone patterns.

The threshold value can be a function of the input values of pixels close to the current pixel, For bi-level halftoning of 8-bit input values, a suitable threshold for an input value of g, where 0<=g<=255, is given by: threshold (g)=C*g*(255−g), where C is a constant value.

Following determination of the halftone output at a current pixel, the error at the current pixel can be used to recursively calculate running sums of influence for determining future pixels.

The typical measure for error at the current pixel at location (x,y) is:

$$e_{x,y} = \text{input\_value}_{x,y} - \text{output\_value}_{x,y}.$$

Running sums for determining future pixels are calculated as follows, where X is the weight factor (typically X=½ for efficient implementation) and Z is a diagonal weight factor (for exactness Z=$X^{\sqrt{2}}$; however, for X=½, Z=$\sqrt[3]{8}/g$ is a reasonable approximation allowing efficient implementation in digital systems). Still with reference to FIG. 6, the running sums may be expressed as follows:

$$L_{x,y} = e_{x,y} + X * L_{x-1,y};$$

$$W_{x,y-1} = D\_\text{left}_{x,y-1} + X * W_{x-,y-1};$$

$$D\_\text{left}_{x,y} = e_{x,y} + Z * D\_\text{left}_{x-1,y-1};$$

$$Q_{x,y} = e_{x,y} + Z * D\_\text{left}_{x-1,y-1} + X * Q_{x,y} + Z * D\_\text{right}_{x+1,y-1};$$

and $$D\_\text{right}_{x,y} = e_{x,y} + Z * D\_\text{right}_{x+1,y-1}.$$

The running sums, $L_{x,y}$ and $W_{x,y-1}$ are only required for processing the current row of pixels.

The running sums, $D\_\text{left}_{x,y}$, $Q_{x,y}$, $D\_\text{right}_{x,y}$ are required for processing the subsequent row of pixels. That is, with the described use of running sums, storage for three values for each pixel of a row (three "line stores") is required for use on the subsequent row.

The methods of determination of halftone output at a current pixel described above all show the property that when an image of constant intensity (g) is halftoned, a usual requirement of halftoning is that the average output intensity be equal to g. For the preferred embodiment, as described so far, the average output intensity for an input image of constant intensity, ht[g] is typically close to g, but not equal to g.

The function ht[g] is however found to be monotonic increasing and if the input range is 0 to g_max, the output range is also 0 to g_max.

That is, there exists an inverse function of ht[g], invht[g] which maps from the range 0 to g_max onto 0 to g_max, such that ht[invht[g]]=g.

So that, by including a pre-processing stage in the preferred embodiment of halftoning, where an input value is first mapped using a 1-dimensional look-up table to ht$^{-1}$[g], the halftoning will produce the required average output intensity for a region of constant input intensity.

Figure 7:
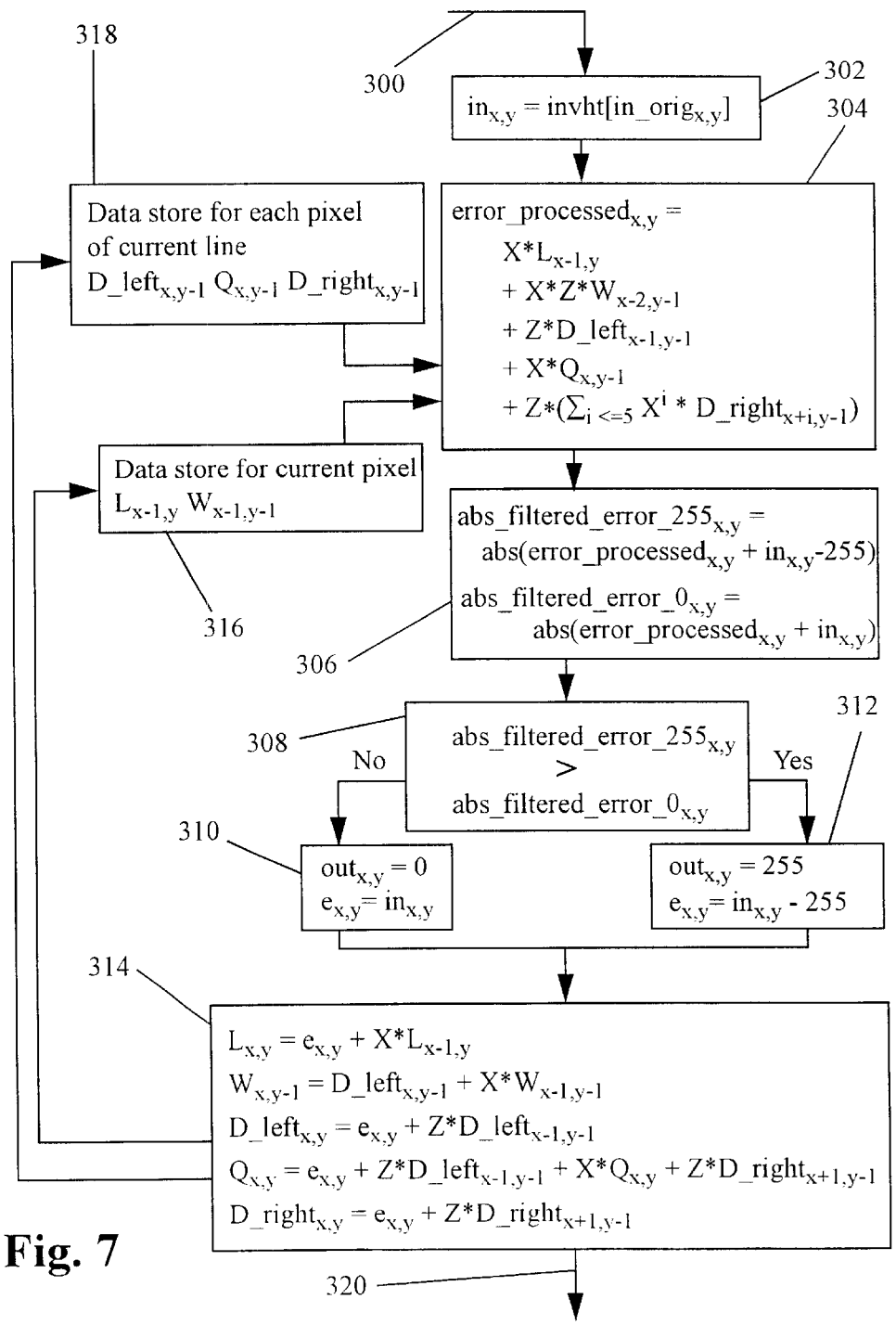
FIG. 7 illustrates a processing flow of the preferred embodiment of filtered error minimisation, using bi-level halftoning of 8-bit input values, and processing for a current pixel at location (x,y)

FIG. 7 shows an overview of a preferred embodiment, being raster order geometrically reducing influence filtered error minimisation halftoning of monochrome 8-bit data to bi-level output data. In particular, FIG. 7 indicates the processing required for an arbitrary current pixel at location (x,y). Because the image is being processed in raster order the output values for pixels at locations (xprev, yprev) have already been determined where (yprev<y) or ((yprev equals y) and xprev<x).

At step 300, the input value at the current pixel in_orig$_{x,y}$ (original input value) is provided. The input value is used to index, as shown in step 302, a 1-dimensional lookup table, invht[ ] ("inverse halftone table") to provided a substitute input value in$_{x,y}$, in order to implement linearisation of average output intensity as described above.

A value, error_processed$_{x,y}$, summarising the influence of all previously processed pixels on the current pixel, is then calculated in step 304 using running sums, $L_{x-1,y}$, $W_{x-2,y-1}$, $D\_\text{left}_{x-1,y-1}$, $Q_{x,y-1}$, $D\_\text{right}_{x+i,y-1}$ (for i=1 to 5) and using weight reducing factors X and Z (where typically X=½ and Z=⅜/g) as described above.

Using error_processed$_{x,y}$ and in$_{x,y}$, the absolute value of filtered error is determined in step 306 for each of the two possible output values of the pixel (0 and 255).

These two absolute values are compared at step 308 and, depending on which is lower, the output value at the pixel, out$_{x,y}$, and the error at the current pixel, e$_{x,y}$, are set accordingly as shown at steps 310 and 312.

The error at the current pixel e$_{x,y}$ is then used recursively at step 314 to calculate new running sums $L_{x,y}$, $W_{x,y-1}$, $D\_\text{left}_{x,y}$, $D\_\text{right}_{x,y}$ which are later used, in steps 316 and 318, to process subsequent pixels. Step 314 outputs at step 320 the halftoned output value out$_{x,y}$ corresponding to the input in$_{x,y}$.

The above descriptions of monochrome halftoning can be extended to color halftoning by processing each color component independently. When halftone output at a current pixel is determined by "cost minimisation mixed with other halftoning", the other halftoning method can be used to anti-correlate the output values of different color components.

For example, when cost minimisation halftoning is mixed with dither halftoning for Red Green Blue (RGB) halftoning, one dither matrix with values $d_{i,j}$ where (0<=$d_{i,j}$<=d_max) can be used for the Green color component, and the "reverse" dither matrix with values (d_max−$d_{i,j}$) can be used for the Red and Blue color components.

The above descriptions of monochrome halftoning can also be extended to color halftoning by determining the halftone output values for each color component for a pixel at the same time. In this case, running sums are required for each color component.

For filtered error minimisation halftoning, a measure of the filtered error at a current pixel can be determined as the sum over the three color components of the squares of the filtered error at the current pixel for each color component.

Inherent in the geometrically reducing influence halftoning technique described above is the step of multiplying a weight reducing factor by an influence value for a first current pixel (or the sum of an influence value for a first current pixel with an error value for the first current pixel), to obtain an influence value for a second current pixel, where:

(i) the influence value for the first current pixel is a sum over a set of pixels of the product of a weight value for the pixel with an error value for the pixel and the pixel weight value is substantially equal to a weight factor raised to the power of the distance of the pixel from the first current pixel; and (ii) the influence value for the second current pixel is similarly a sum over a set of pixels of the product of a weight value for the pixel with an error value for the pixel and the pixel weight value is substantially equal to a weight factor raised to the power of the distance of the pixel from the second current pixel.

A requirement of this step is that the set of pixels, over which the first influence value is summed, has substantially the same orientation from the first current pixel and the second current pixel, so that for each pixel in the set, the change in distance of the pixel from the first current pixel to its distance from the second current pixel is approximately the same.

In contrast, with error diffusion, when the output sum of a first current pixel is distributed to neighbouring unprocessed pixels, an input sum for a neighbouring second current pixel is augmented by addition of a portion of the output sum. That is, the calculation of the portion is the product of a weight reducing factor with the output sum of the first current pixel where the output sum of a first current pixel is a sum over a set of pixels of the product of a weight value and a pixel error value and where the portion itself is consequently also a sum over a set of pixels of a product of a weight value for a pixel and a pixel error value.

Figure 25A:
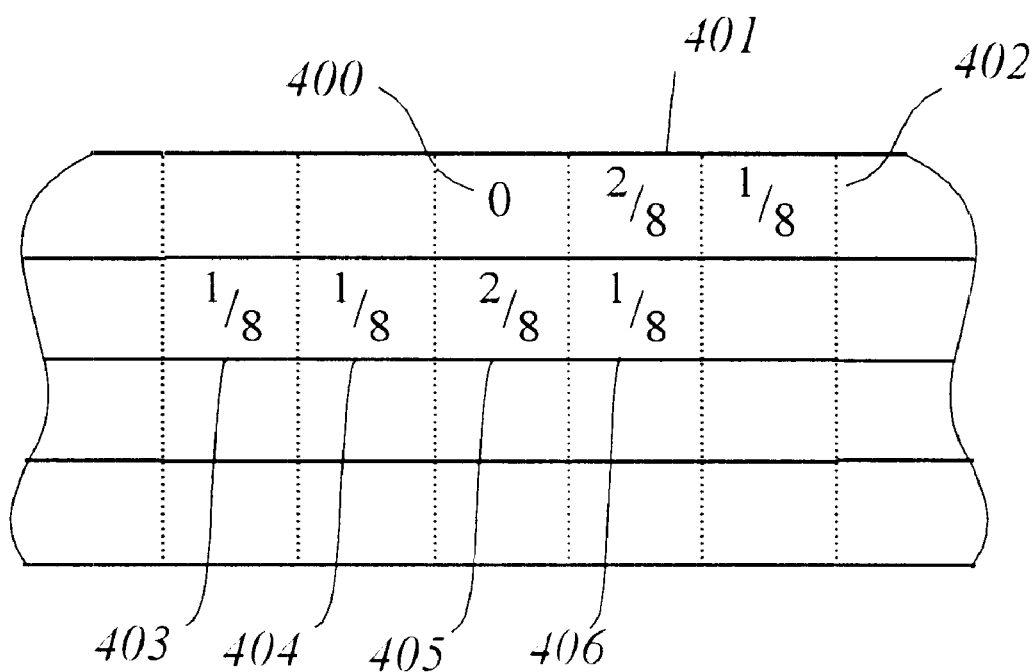
FIGS. 25A and 25B illustrate a prior art error diffusion process.
Figure 25B:
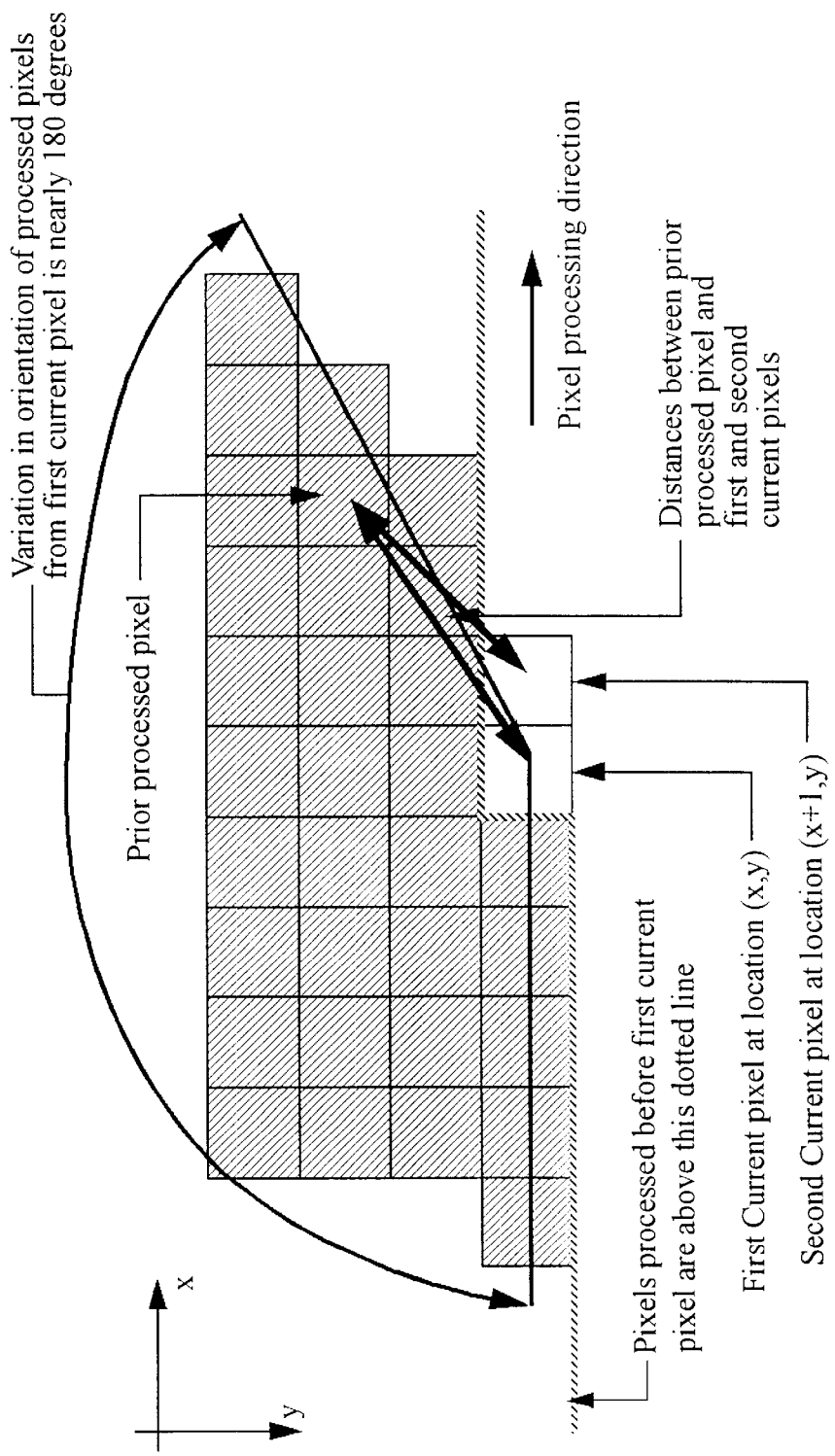

Assume that each weight value of a pixel in the output sum of a first current pixel is substantially equal to a weight factor raised to the power of the distance of the pixel from the first current pixel and consider the calculation of the portion of the output sum allocated to a close neighbouring unprocessed pixel—a second current pixel. When the first current pixel is not at an edge of the image, and the image is processed in raster order, the set of pixels which contribute to the output sum of the first current pixel have a wide variation in orientation to the first current pixel—the variation is nearly 180 degrees. Consequently, it is not possible that each weight value of the portion is substantially equal to a weight factor raised to the power of the distance of the pixel from the second current pixel. The above can be seen by considering FIG. 25B and the distance of a prior processed pixel from the first current pixel and from the second current pixel. For the particular prior processed pixel shown, the distance to the second current pixel is actually less than the distance to the first current pixel. Further, for all second current pixels which are close neighbours of the first current pixel (eg. immediately adjacent s in FIG. 25B), it is not possible that each weight value of the received portion is substantially equal to a weight factor raised to the power of the distance of the pixel from the second current pixel. Accordingly, geometrically reducing influence halftoning is distinguishable from halftoning by error diffusion Force Field Halftoning For the sake of simplicity, a first embodiment of force field halftoning ("FFH") will be described with reference to a monochrome output display, wherein each pixel value of an output image (the output pixel value) can take on a bi-level value of totally "off" or totally "on". For example, in a black and white output image, the output pixel value of totally "off" represents the black color and totally "on" represents the white color. In the monochrome case, an "off" pixel value will also be referred to hereunder as a black pixel value, and an "on" pixel value as the white pixel value.

The process described hereinafter equally applies to color image displays or multilevel displays, where each independent color of an output pixel of an image is independently processed or output pixel can take on two or more values respectively. For example, in the red, green and blue (RGB) component display format, the red color component of an output pixel value can take a totally "on" or totally "off" value representing a presence or absence of the red color respectively. In a substantially similar manner the green component and the blue component can be assigned a totally "on" or totally "off" values. In this manner, each of the red, green and blue colors can be halftoned independently.

Figure 8:
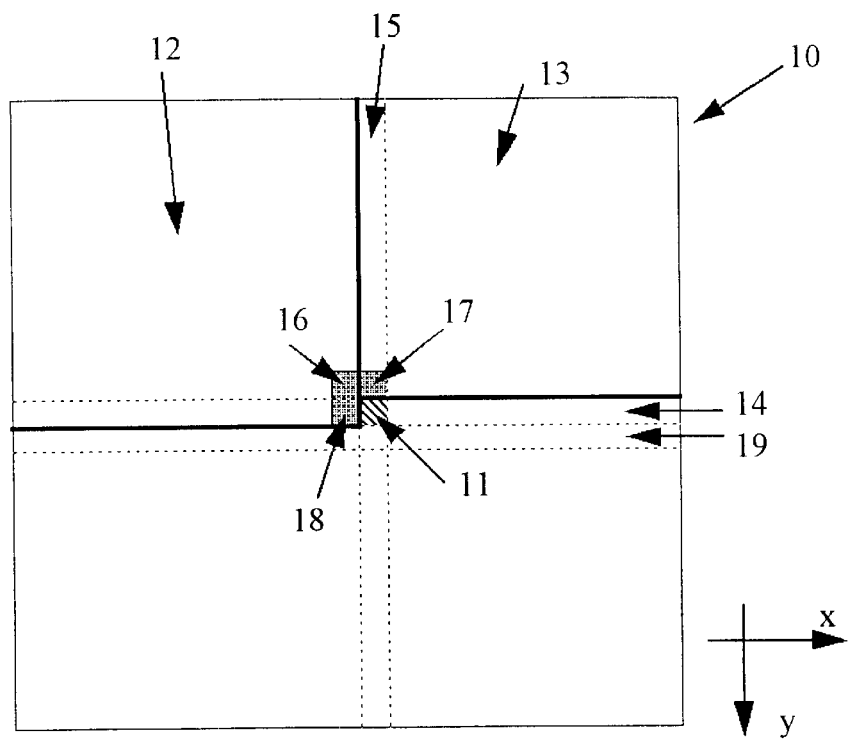
FIG. 8 illustrates an example of quadrant division of an image frame for use with a number of embodiments of the present invention.

Referring now to FIG. 8, there is shown an image 10, where an output pixel value of a current pixel 11 is to be determined. An upper left quadrant 12 and an upper right quadrant 13 of pixels of the image 10 whose output pixel values have been determined are also illustrated. The upper left quadrant 12 comprises all pixels whose output values are known and are in an upper left region of the image 10 relative to the current pixel 11. The upper right quadrant 13 comprises all pixels whose output values are known and are in an upper right region of the image 10 relative to the current pixel 11 including pixels on a current column 15 above the current pixel 11, but not including pixels on a current line 14, in which the current pixel 11 lies. It will be appreciated from FIG. 8, that for a display that is scanned in raster order, the "quadrants" mentioned above will not, in most instances, be representative of one quarter of the image 10. For example, for a current pixel on a first scan line of the image 10 there will be no upper right quadrant 13, and the upper left quadrant 12 will comprise only those pixels on the first scanline that have been halftoned. Similarly, for the first pixel of a last scan line of the image, there will be no upper left quadrant 12 and all pixels on all previous scanlines will be included in the upper right quadrant 13. Accordingly, the term "quadrant" is used herein with some license to indicate an arbitrary area of previously halftoned pixels.

Figure 9:
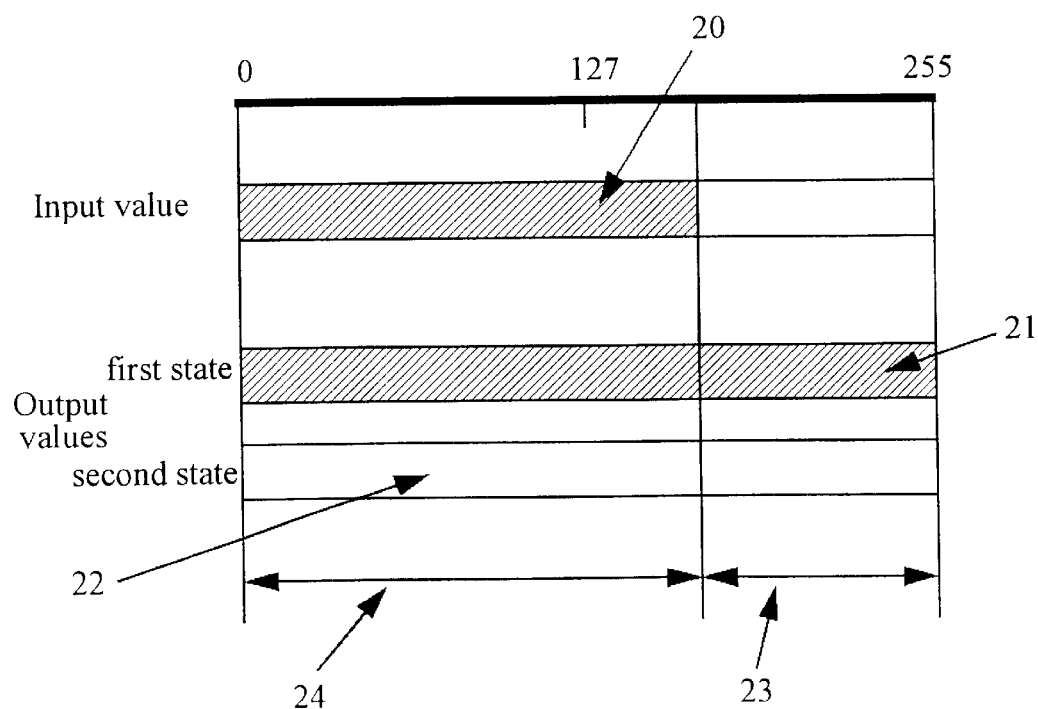
FIG. 9 is a schematic representation of an input value of a pixel and output pixel values utilised by the embodiments.

Referring now to FIG. 9, an input value 20 is shown for a current pixel 11 $v_{x,y}$ that can take on a single value between 0 and 255, thereby representing 256 Gray-scale levels from 0 (black) to 255 (white). An output value of the current pixel 11 can take on one of two possible states in a (bi-level monochrome case), a first state 21 being the totally "on" value (white color value), and a second state 22 being the totally "off" value (black color value).

One of the two possible states 21, 22 is chosen for the output pixel value of the current pixel 11 as described below. Further to determining the output value, an over result value and an under result value for the current pixel 11 are also determined following the outcome of the choice of the output pixel value of the current pixel 11. The over result value 23 and the under result value 24 shall be referred to hereinafter for the described monochrome example as the excess white value ($w_{x,y}$) and the excess black value ($b_{x,y}$) respectively.

If the current pixel 11 output value is chosen to be the white color value 21, then the excess white value ($w_{x,y}$) for the current pixel 11 is assigned a value 23 equal to a difference between the white color value 21 and the input value 20 of the current pixel 11. Following the choice of a white color value 21 as the current pixel 11 output value, the excess black value ($b_{x,y}$) for the current pixel 11 is assigned the value of zero, ie. for $h_{x,y}=255$, $w_{x,y}=255-v_{x,y}$, and $b_{x,y}=0$.

Alternatively, if the current pixel 11 output value is chosen to be the black color value 22, then the excess white value ($w_{x,y}$) for the current pixel 11 is assigned the value zero and the excess black value ($b_{x,y}$) for the current pixel 11 is assigned a value 24 equal to the input value 20, ie. for $h_{x,y}=0$, $w_{x,y}=0$, and $b_{x,y}=v_{x,y}$.

Consequently, each previously halftoned pixel, wherein the output pixel value has been determined, has associated therewith an excess white value ($w_{i,j}$) and an excess black value ($b_{i,j}$).

Figure 10:
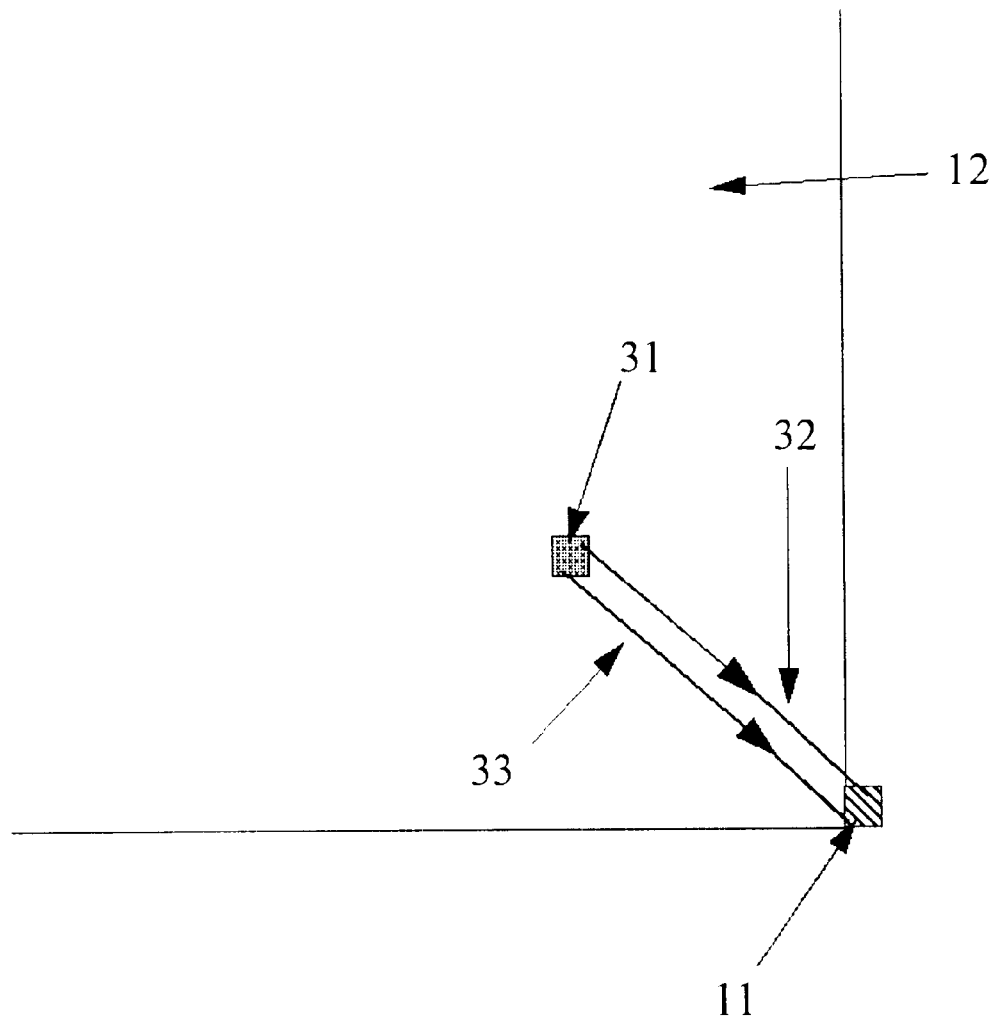
FIG. 10 is a schematic representation of a white and black repulsive force between a halftoned pixel and a current pixel in accordance with a number of embodiments of the present invention.

Referring now to FIG. 10, there is shown in more detail the upper left quadrant 12 of FIG. 8. A previously halftoned pixel 31 will have associated therewith an excess white value 23 and an excess black value 24 as well as an output value.

A "white repulsive force" 32 and a "black repulsive force" 33 are determined between the current pixel 11 and the previously halftoned pixel 31. The "white repulsive force" 32 is a measure of a tendency to not choose a white color value 21 for the output value of the current pixel 11. The "black repulsive force" 33 is a measure of a tendency to not choose a black color value 22 for the output value of the current pixel 11.

The white repulsive force 32 between the current pixel 11 and the halftoned pixel 31 is determined by a product of three values, being firstly a weight value, secondly the white excess value of the halftoned pixel 31, previously determined, and thirdly the white excess value of the current pixel 11, which results when the current pixel is chosen to have the white color value 21 as the output value.

The black repulsive force 33 between the current pixel 11 and the halftoned pixel 31 is determined by a product of three values, being firstly a weight value, secondly the black excess value of the halftoned pixel 31, and thirdly the black excess value of the current pixel 11, which results when the current pixel is chosen to have the black color value 22 as the output value.

Hence, the current pixel 11 has associated therewith the above mentioned white repulsive force 32 and black repulsive force 33 between itself and the halftoned pixel 31. Corresponding forces also exist between the current pixel 11 and each other halftoned pixel.

In the specific embodiment, an over result repulsive measure (hereinafter referred to as the "total white repulsive force") and an under result repulsive measure (hereinafter referred to as the "total black repulsive force") are each determined for the current pixel 11 from all previously halftoned pixels in the upper left quadrant 12 and the upper right quadrant 13.

The total white repulsive force for the current pixel 11 is given by the sum of the white repulsive force 32 for each halftoned pixel 31. In a similar manner, the total black repulsive force for the current pixel is given by the sum of the black repulsive force 33 for each halftoned pixel 31.

An output value of the current pixel 11 is determined from a comparison between the total white repulsive force and the total black repulsive force for the current pixel 11. If the total white repulsive force of the current pixel 11 is less than the total black repulsive force of the current pixel 11, the output value of the current pixel 11 is assigned the white color value 21. Alternatively, if the total black repulsive force of the current pixel 11 is less than the total white repulsive force of the current pixel 11, the output value of the current pixel 11 is assigned the black color value 22.

The total black repulsive force "$Fb_{x,y}$" and the total white repulsive force "$Fw_{x,y}$" for a current pixel at coordinate position (x,y) can be expressed by the following equations;

$$Fb_{x,y} = \sum_{i,j} X_{i,j} b_{i,j} b_{x,y} \quad \text{(EQ 1)}$$

$$Fw_{x,y} = \sum_{i,j} X_{i,j} w_{i,j} w_{x,y} \quad \text{(EQ 2)}$$

where $X_{i,j}$ are predetermined weight values, $b_{i,j}$ is the black excess value, and $w_{i,j}$ is the white excess value of a previously halftoned pixel at a line number "j" counting from the top of the image and pixel position number "i" counting from the left side of the image. For example, coordinate of a pixel in the top most left corner of the image is i=1 and j=1.

The $b_{x,y}$ is the excess black value for the current pixel 11 assuming that the current pixel output value is chosen to be the black color value 22.

The $w_{x,y}$ is the excess white value for the current pixel 11 assuming that the current pixel output value is chosen to be the white color value 21.

Figure 11:
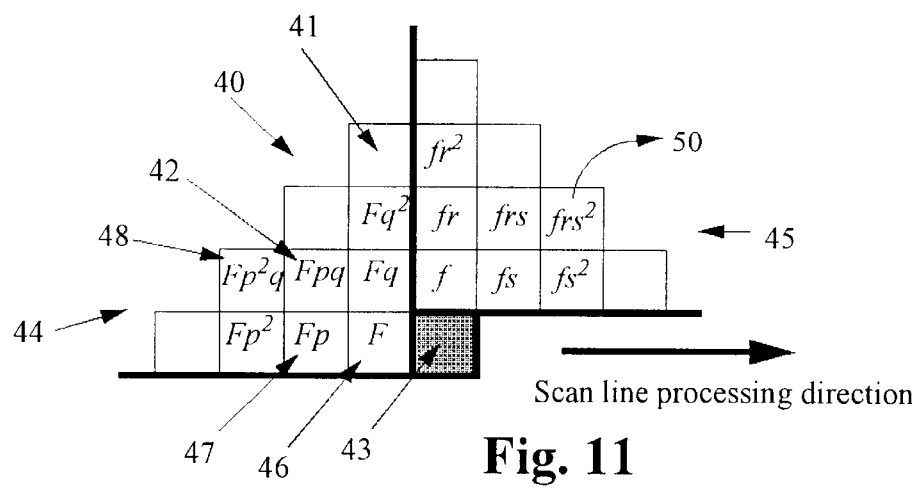
FIG. 11 represents an example of a set of weight values utilised in the determination of the under result and the over result repulsive measure in accordance with a number of embodiments of the present invention.

Referring now to FIG. 11, there is shown a set 40 of coefficients utilized in the determination of the total white repulsive force or the total black repulsive force for the. current pixel 11. Each cell position 41 of the set 40 has associated therewith a predetermined coefficient being a weight value 42 to which the excess white value or the excess black value is multiplied in the determination of the total white repulsive force or total black repulsive force for the current pixel 11 respectively.

The set 40, as illustrated in FIG. 11, is divided into left quadrant weight values 44 and right quadrant weight values 45, so that each cell position 41 corresponds to a position of a previously halftoned pixel in the upper left pixel quadrant 12 and the upper right pixel quadrant 13 respectively.

A lead cell position 43 of the set 40 corresponds to the position of the current pixel 11 being processed, and no coefficient is associated with this lead cell position 43.

Preferably, the left quadrant weight values 44 of the set 40 has a cell entry in a first column, first row having a predetermined weight value "F" 46, the second column, first row having a weight value equal to the predetermined weight value of the first row, first column multiplied by a first predetermined ratio "p" to form the weight value "Fp" 47. In this manner, each cell entry of the left quadrant weight values 44 takes on a weight value equal to the weight value of the cell entry to the immediate right position multiplied by the first predetermined ratio "p". Further for each row above the first row of the left quadrant weight values 44, a cell entry in the row takes on a weight is value equal to the weight value of the cell positioned immediate below multiplied by a second predetermined ratio "q". For example, the weight value of the cell entry two columns to the left of the first column and one row above the first row takes on the value "$Fp^2q$" 48.

Similarly, the right quadrant weight values 45 of the set 40 has a cell entry in a first column, first row "f" 49, so that for example the cell entry two columns to the right and one row above has a weight value of "$fsr^2$" 50. In other words, a cell entry of the right quadrant weight values 45 takes on a value equal to the value of the cell of the first column, first row multiplied by a third predetermined ratio "s" raised to the power of the number of columns away from the first column and further multiplied by a fourth predetermined ratio "r" raised to the power of the number of rows away from the first row.

The weight values (coefficients) of the set 40 are represented in Equation 1 and Equation 2 by $X_{i,j}$.

The total white repulsive force for the current pixel 11 is determined by summing the product of each weight value of the set 40 by the excess white value ($w_{i,j}$) for each corresponding halftoned pixel and the excess white value ($w_{x,y}$) of the current pixel 11 (assuming the current pixel output value is chosen as the white color value) over all halftoned pixels (see Equation 2). The total black repulsive force for the current pixel 11 is also determined, in substantially the same manner as the total white repulsive force, wherein the excess black values ($b_{i,j}$) of previously halftoned pixels and the excess black value ($b_{x,y}$) of the current pixel 11 (assuming the current pixel output value is chosen as the black color value) are utilized accordingly (see Equation 1).

The total black repulsive force and the total white repulsive force for the current pixel 11 can be determined from contributions to the respective force by each of the upper left 12 and upper right 13 halftoned pixel quadrants.

A white left quadrant value ($QWleft_{x-1,y}$) can be determined by summing the product of each weight value of the left quadrant weight values 44 with the excess white value ($w_{i,j}$) of the corresponding halftoned pixel in the upper left quadrant 12 of halftoned pixels.

A white right quadrant value ($QWright_{x,y-1}$) can be determined by summing the product of each weight value of the right quadrant weight values 45 with the excess white value ($w_{i,j}$) of the corresponding halftoned pixel in the upper right quadrant 13 of halftoned pixels.

Similarly a black left quadrant value ($QBleft_{x-1,y}$) and a black right quadrant value ($QBright_{x,y-1}$) can be determined.

The total black repulsive force "$Fb_{x,y}$" and the total white repulsive force "$Fw_{x,y}$" for the current pixel at coordinate position (x,y) can then be expressed by the following equations:

$$Fb_{x,y}=(QBleft_{x-1,y}+QBright_{x,y-1})*b_{x,y}$$

$$Fw_{x,y}=(QWleft_{x-1,y}+QWright_{x,y-1})*w_{x,y}.$$

Although a significant speed advantage can be gained by halftoning a row of pixels with every pass of a row of pixels, in order to reduce memory requirements, it is generally required that two passes of the halftoning process are required per row of pixels to determine the total white and total black repulsive force for each pixel. A two pass halftoning process per row of pixels can now be described.

On a first pass of a single row (y) of pixels proceeding from left to right, for each pixel at coordinate position (x,y), the output value of the pixel is determined using quadrant values $QBleft_{x-1,y}$ and $QBright_{x,y-1}$ and $QWleft_{x-1,y}$ and $QWright_{x,y-1}$ and also new left quadrant values $QBleft_{x,y}$ and $QWleft_{x,y}$ are determined. During a second pass of the same row (y) of pixels proceeding from right to left, for each pixel at coordinate position (x,y), new right quadrant values $QBright_{x,y}$ and $QWright_{x,y}$ are determined.

Alternatively, a speed advantage, obtained at the cost of use of extra memory, can be gained by a single pass halftoning process per row of pixels which is now described.

Each row (y) of pixels is processed either in the direction from left to right or in the direction from right to left, and the processing direction is opposite to the preceding row (y−1) of pixels.

If the row (y) of pixels is processed from left to right, then, for each pixel at coordinate position (x,y), left quadrant values $QBleft_{x-1,y}$ and $QWleft_{x-1,y}$ are determined, and the output value of the pixel is determined using quadrant values $QBleft_{x-1,y}$ and $QBright_{x,y-1}$ and $QWleft_{x-1,y}$ and $QWright_{x,y-1}$ and also new left quadrant values $QBleft_{x,y}$ and $QWleft_{x,y}$ are determined.

If the row (y) of pixels is processed from right to left, then, for each pixel at coordinate position (x,y), right quadrant values $QBright_{x+1,y}$ and $QWright_{x+1,y}$ are determined, and the output value of the pixel is determined using quadrant values $QBleft_{x,y-1}$ and $QBright_{x+1,y}$ and $QWleft_{x,y-1}$ and $QWright_{x+1,y}$ and also new right quadrant values $QBright_{x,y}$ and $QWright_{x,y}$ are determined.

Figure 12:
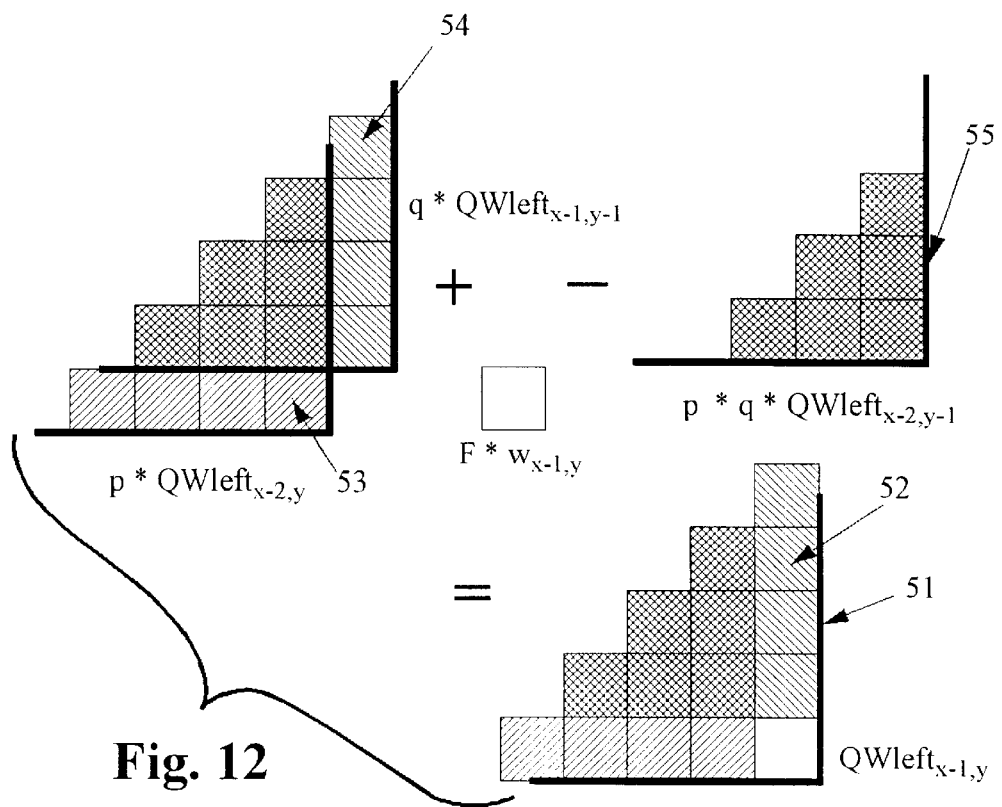
FIG. 12 schematically represents an example of a contributive portion of the over result repulsive measure by an upper left quadrant of halftoned pixels and its determination thereof in accordance with a number of embodiments.

Referring now to FIG. 12, there is shown a diagrammatic description of the preferred method of determining a white left quadrant value. A black left quadrant value and a white right quadrant value and a black right quadrant value can be determined in a substantially similar manner.

A white left contribution quadrant, 51, shown in FIG. 12, has each entry 52 of this quadrant given by a multiplication of a white excess value of a halftoned pixel in the upper left quadrant 12, and a corresponding weight value 42 of the left quadrant weight values 44 then summed over all pixels in the upper left quadrant 12 so as to produce a single value, $QWleft_{x-1,y}$, for the white left contribution quadrant 51.

A single value, $QWleft_{x-2,y}$ for the white left contribution quadrant 53 of pixel 18 to the left of the current pixel 11 and a single value, $QWleft_{x-1,y-1}$ for the white left contribution quadrant 54 of pixel 17 above the current pixel is determined prior to halftoning the pixels 17 and 18. Further, a single value, $QWleft_{x-2,y-1}$ for the white left contribution quadrant 55 of pixel 16 positioned above and to the left of the current pixel 11 is determined prior to halftoning pixel 16.

The single value, $QWleft_{x-1,y}$ for the white left contribution quadrant 41 of the current pixel 11, the current pixel having coordinate position (x,y) is determined by the following recursive equation:

$$QWleft_{x-1,y}=F*w_{x-1,y}+p*QWleft_{x-2,y}+q*QWleft_{x-1,y-1}-p*q*QWleft_{x-2,y-1},\qquad (EQ\ 3)$$

where $w_{x-1,y}$ is the white excess value of the pixel 18 to the left of the current pixel 11. Hence the white left quadrant value, $QWleft_{x-1,y}$ for the current pixel 11 is determined in a recursive manner from the white left quadrant values, $QWleft_{x-2,y}$, $QWleft_{x-1,y-1}$, $QWleft_{x-2,y-1}$ previously determined prior to halftoning the adjacent pixels 16, 17 and 18 (F being the predetermined weight value 46).

Upon the determination of the total white repulsive force and the total black repulsive force for the current pixel 11, the total white repulsive force is compared to the total black repulsive force of the current pixel 11. If the total white repulsive force is less than the total black repulsive force, the output value of the current pixel 11 is assigned the white color value 21. Alternatively, if the total white repulsive force is greater than the total black repulsive force the output value of the current pixel 11 is assigned the black color value 22. In the case where the total white and total black repulsive force are equal the output value of the current pixel 11 is arbitrarily assigned either the black 22 or white 21 color value.

The determination of the total white repulsive force and the total black repulsive force of previously halftoned pixels to a current pixel is not limited to the computational technique described with reference to FIG. 11 and FIG. 12. For example, the total white and black repulsive force for a current pixel can be determined by applying Equation 2 and Equation 1 to any region of previously halftoned pixels and the current pixel, the previously halftoned pixels having associated therewith an excess white value and an excess black value as hereinbefore described.

At a first pixel of an image, typically, no previously halftoned pixels are present in the image and in this case the first pixel of the image is halftoned by assigning to the output value the closest chosen output state value to the input value (ie. error diffused). As an alternative, the first pixel can be dithered.

Figure 13:
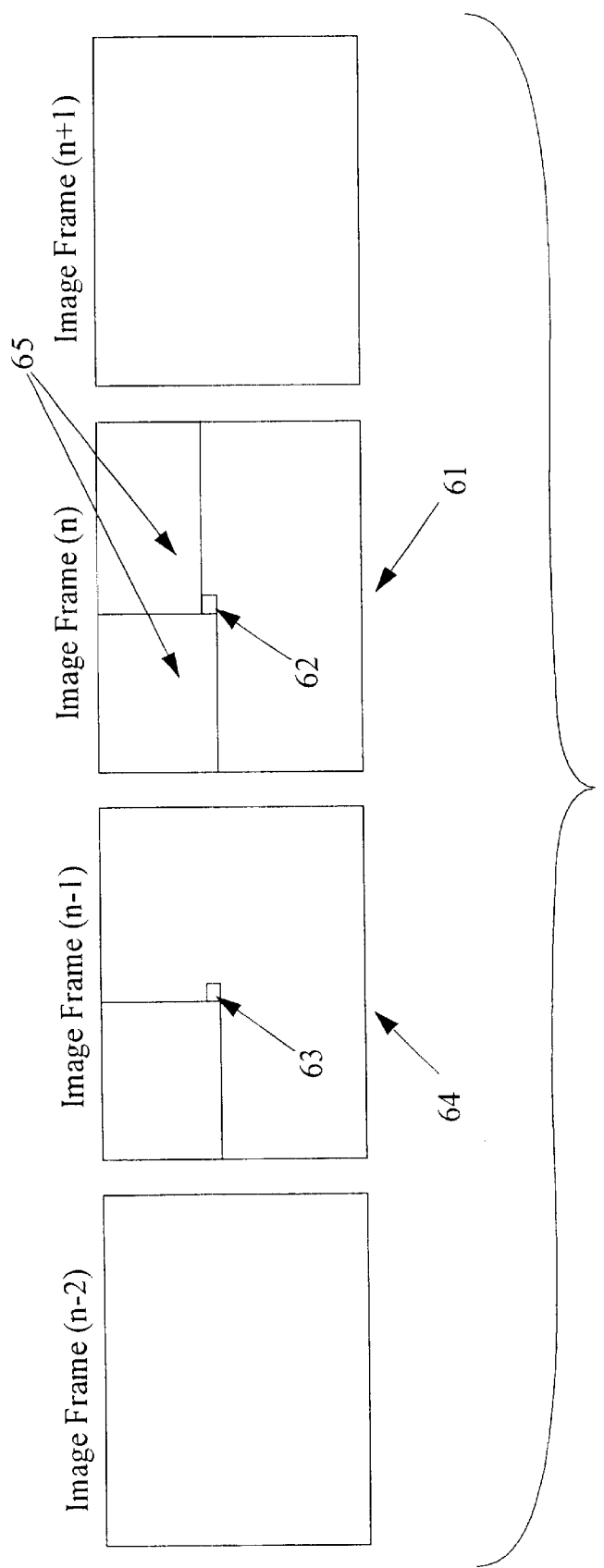
FIG. 13 is a schematic diagram of halftoning an image sequence in accordance with the second and third force field halftoning embodiments of the present invention.

A second embodiment of FFH, being a variation on the first embodiment of FFH, can be described with reference to FIG. 13. Illustrated in FIG. 13 is a sequence of image frames 60 forming part of a moving picture, for example, video images having motion data or characteristic noise data.

In this embodiment, a current pixel 62 of a current image frame (n) 61 is assumed to take on an output value equal to the output value of a corresponding pixel 63 of a previous image frame (n−1) 64. For example, in the monochrome case, if the output value of the corresponding pixel 63 is the white color value, the current pixel 62 is assumed to take on an output value equal to the white color value.

A total white repulsive force for the current pixel 62 is then determined between regions 65 of previously halftoned pixels of the current image frame (n) 61 and the current pixel 62 which is assumed to have the white color value. The total white repulsive force for the current pixel 62 is determined as described above with reference to FIGS. 10, 11 and 12. If the total white repulsive force for the current pixel 62 is less than a first threshold value equal to the sum of the excess black repulsive force for the current pixel 62 and a first threshold increment value, the output value of the current pixel 62 is assigned a value equal to the output value of the corresponding pixel 63 of the previous image frame (n−1) 64.

This can be expressed in the following manner, where the output value for a corresponding pixel of the previous frame is known, for example stored in a frame memory, that output value is accepted if:

$$F_{prev.} < \min(Fb, Fw) + \text{threshold increment}.$$

The threshold increment value can be a fixed value preset for the particular display or type of image being displayed. Preferably however, the threshold increment varies as some function of the image content. For example, the threshold increment can be a function of the input value (grey level) of a pixel. Alternatively, the threshold increment can be determined from a function of local edge conditions, or from a function of the local grey level, or from a function of the local amount of change in pixel input values between image frames, or as a combination of these functions, where local refers to use of nearby pixels in determining the function value.

Similarly, if the corresponding pixel 63 of the previous image frame (n−1) 64 has an output value equal to the black color value, a total black repulsive force for the current pixel 62 is determined and compared to a second threshold value. If the total black repulsive force for the current pixel 62 is less than a second threshold value, the second threshold value being equal to the sum of the excess white repulsive force for the current pixel 62 and a second threshold increment value, the output value of the current pixel 62 of the current frame (n) 61 is assigned a value equal to the output value of the corresponding pixel 63 of the previous image frame (n−1) 64.

In the case where the output value of the corresponding pixel 63 of the previous frame is the white color value and the total white repulsive force for the current pixel 62 is not less than the first threshold value, or in the case where the output value of the corresponding pixel 63 of the previous frame is the black color value and the total black repulsive force for the current pixel 62 is not less than the second threshold value, then both a total white repulsive force and a total black repulsive force is determined for the current pixel 62 on the basis that the output value of the current pixel 62 can take on either a white color value or a black color value (as described by the first embodiment of FFH). In this case, the total white repulsive force and the total black repulsive for the current pixel 62 are compared to determined which of the forces (white repulsive or black repulsive) has the lowest value. If it is determined that the total white repulsive force is less than the total black repulsive, the output value of the current pixel 62 is assigned the white color value. If, however, it is determined that the total black repulsive force is less than the total white force, the output value of the current pixel 62 is assigned the black color value. Finally, where the total white repulsive force for the current pixel 62 is equal to the total black repulsive force for the current pixel 62, the output value of the current pixel 62 is arbitrarily assigned either the black or white color value.

In a further embodiment of FFH, adapted from the first and second embodiments, force field halftoning can be combined with any other method of halftoning to halftone one or more images or image frames.

That is, firstly the output value of the current pixel 11 of an image frame is determined by any method of halftoning. Then, similarly to the first and second embodiments of FFH, that output value is accepted if the repulsive force associated with that output value of the current pixel is less than the sum of the minimum repulsive force achievable for any output value of the current pixel and a threshold value. In the event that the predetermined output value is not accepted, then the output value of the pixel is assigned an output value which provides the minimum achievable repulsive force for the pixel.

A third embodiment of FFH is substantially as the second embodiment, excepting that the output value of the current pixel 62 is not assumed to take on the output value of the corresponding pixel 63, but is determined by a process of dithering. An input value of the current pixel 62, of the current image frame 61 in the sequence of image frames 60, is compared to a dither value of a dither matrix to select a dithered output value for the current pixel 62. The output value of the current pixel 62 takes on the dithered output value, instead of the output value of the corresponding pixel 63 described in the second embodiment. Upon the selection of the dithered output value as the output value, the third embodiment proceeds as described in the second embodiment, to determine if the dithered value is to be assigned as the output value of the current pixel 62 or if the output value is to be determined by finding the least value between a total white repulsive force and a total black repulsive force for the current pixel 62 as previously described. The third embodiment thus is representative of a combination of force-field halftoning and dithering.

When the third embodiment is applied in color display systems, it is advantageous that the dithering process be anti-correlated. For example, where each pixel includes red, green and blue pixel elements, anti-correlation makes use of the fact that the luminance of green is approximately equal to the summed luminance of red and is blue. The effect of this is seen from a comparison of FIG. 14A with FIG. 14B. In FIG. 14A, a traditional dithered image is depicted reproducing a mid-level grey tone on an RGB bi-level display 70. With a mid-level grey tone, half 72 of the pixels 71 are enabled with each thus emitting red, green and blue. The other half 73 of the pixels 71 are disabled, thus giving 50% intensity However, with anti-correlated dithering, shown in FIG. 14B, only selected colors in each pixel 76 of a display 75 are enabled. The selected colors include red and blue in pixels 77, and green in the other, alternate pixels 78. Because the luminance transitions between pixels is reduced, a better quality image is perceived by the eye, compared with the display of FIG. 14A.

One example of the relative performance of force-field halftoning as described herein can be compared with prior halftoning methods, the results of which are seen in FIGS. 15A, 15B and 15C, where a single tone grey scale image has been halftoned. FIG. 15A illustrates a characteristic halftone pattern produced by error diffusion. The pattern displays a well known "wave-like" pattern, which many in the art refer to as "worms". FIG. 15B illustrates a characteristic halftone pattern produced from the same input by dithering in which it is noted that the pattern is random but the instances of pixels turned on (white pixels) is not optimally spread. In contrast, the characteristic halftone pattern produced from the same input by force field halftoning as described herein is shown in FIG. 15C which produces a near optimally spread pattern thus being a noticeable improvement over the processes of dithering and error diffusion, at least for certain classes of images. A second example of improved performance of force field halftoning, in this case with respect to error diffusion, occurs in the halftoning of sequences of images and in the reduction of sparkling noise mentioned above. In particular, the third embodiment involving the mixing of force field halftoning and dithering causes the displayed halftone image to become more stable thus affording a better halftone pattern over the entire sequence.

A third example of improved performance of force field halftoning, in this case with respect to dithering, occurs in the halftoning of image details including text and region edges.

In the embodiments described with reference to FIGS. 8 to 13, the various force field halftone calculations carried out were based upon the influence of previously processed pixels divided into "quadrants" of the image being displayed. Importantly, as clearly seen in FIG. 11, the influence of the coefficients p, q, r and s on the corresponding pixels and their contribution to the calculation of force as it applies to the current pixel 43, drops away in equal amounts in each direction from the current pixel 43. Accordingly, for example, if p=q and r=s in FIG. 11, the reducing influence of the coefficients can be represented by a corresponding diagonal line that creates a diamond or triangular shape with respect to the current pixel 43.

The present inventor has determined that more optimal results occur where the influence of previously halftoned pixels is substantially proportional to the distance between the halftoned pixel and the current pixel. Accordingly, whereas FIG. 11 illustrates a diamond or triangular-shaped influence, the most optimised influence is that represented by a circle centred upon the current pixel. The present inventor has etermined that the circle optimisation can be approximated by dividing the two quadrants of previously halftoned pixels into a number of "wedges" that extend substantially radially from the current pixel.

Figure 16:
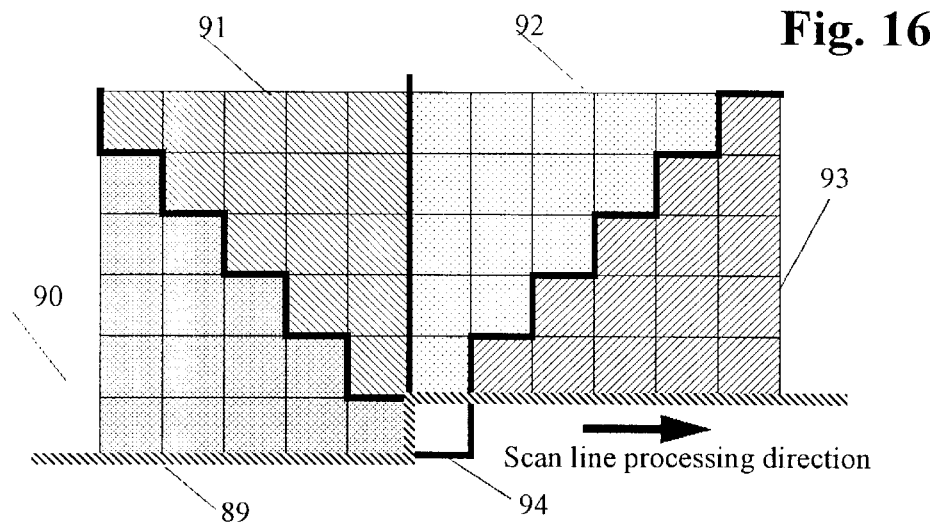
FIG. 16 depicts a further embodiment of force field halftoning based upon dividing the preceding portions of the image into wedges.

In FIG. 16, the previous two quadrants 12 and 13 of FIG. 8, are divided into four wedges 90, 91, 92, and 93 used for the halftoning of a current pixel 94 and include all previously processed pixels above the broken line 89. These four wedges 90–93 provide four wedge values for excess black results and four wedge values for excess white results, in which each wedge value summarises the influence on the current pixel 94 of previously processed pixels within the corresponding wedge of pixels.

As with force field halftoning using quadrant values, the present embodiment of force field halftoning using wedge values, processes an image on a scanline-by-scanline basis, from the top of the image to the bottom. The processing for each scanline typically consists of a forward pass followed by a reverse pass of the saline scanline illustrated in FIGS. 17 and 18. However, processing can also consist of a single pass per scanline in a similar manner to the description above of force field halftoning using quadrant values.

Figure 17:
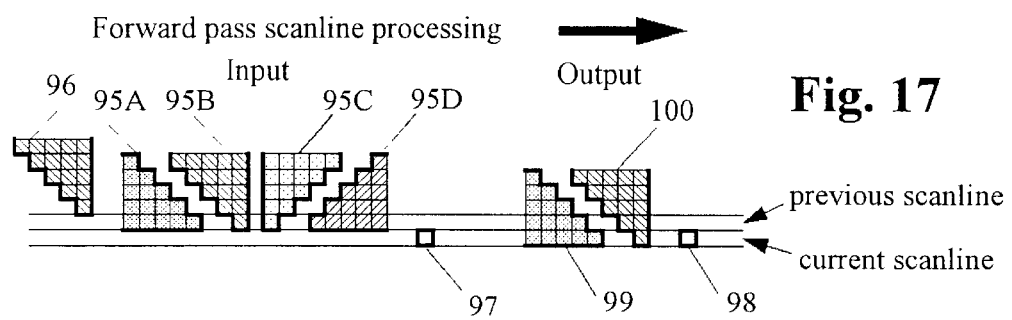
FIGS. 17 and 18 depict forward and reverse pass scanline processing in the embodiment of FIG. 9.

As seen in FIG. 17, in forward pass processing of a scanline, the input data consists of:

wedge values 95A, 95B, 95C and 95D for the previous scanline;

"top left" wedge values 96 for the line before the previous scanline; and input values 97 for pixels of the current scanline.

The calculated output data consists of:

halftone output values, excess black values and excess white values 98 for pixels of the current scanline; and "bottom left" 99 and "top left" 100 wedge values for the current scanline.

Figure 18:
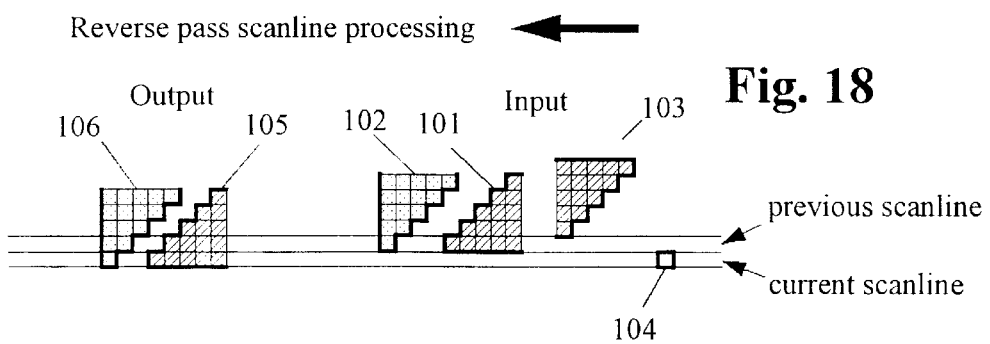

In the reverse processing of a scanline, depicted in FIG. 18, the input data consists of:

"bottom right" 101 and "top right" 102 wedge values of the previous scanline;

"top right" wedge values 103 for the line before the previous scanline; and excess black values and excess white values 104 for the pixels of the current scanline.

The calculated output data consists of:

"bottom right" 105 and "top right" 106 wedge values for the current scanline.

For the embodiment of FIGS. 16, 17 and 18, the current pixel result is determined after calculating the total black repulsive force, "$Fb_{x,y}$" and the total white repulsive force, "$Fw_{x,y}$" for the current pixel at co-ordinate position x,y. The total black repulsive force, "$Fb_{x,y}$" is calculated using wedge values as follows:

$$Fb_{x,y} = \Sigma_{i,j} X_{i,j} b_{i,j} b_{x,y} = (F_{left}*WBbl_{x-1,y} + F_{top\_left}*WBtl_{x-1,y-1} + F_{top}*WBtr_{x,y-1} + F_{top\_right}*WBbr_{x+1,y-1})*b_{x,y}$$

where:

$F_{left}$, $F_{top\_left}$, $F_{top}$, $F_{top\_right}$, and $F_{right}$ are predetermined weight values; and $WBbl_{x,y}$=excess black wedge value for the bottom left wedge of pixels with corner pixel x,y =$\Sigma_{i,j}$ in the bottom left wedge of pixels with corner pixel at x,y $X_{ij} b_{ij}$. A similar determination applies also for $WBtl_{x,y}$, $WBtr_{x,y}$, and $WBbr_{x,y}$.

Similarly, the total white repulsive force, "$Fw_{x,y}$" is calculated using wedge values as follows:

$$Fw_{x,y} = \Sigma_{i,j} X_{i,j} w_{i,j} w_{x,y} = (F_{left}*WWbl_{x-1,y} + F_{top\_left}*WWtl_{x-1,y-1} + F_{top}*WWtr_{x,y-1} + F_{top\_right}*WWbr_{x+1,y-1})*w_{x,y}$$

where:

$WWbl_{x,y}$=excess white wedge value for the bottom left wedge of pixels with corner pixel x,y =$\Sigma_{i,j}$ in the bottom left wedge of pixels with corner pixel at x,y $X_{ij} w_{ij}$.

A similar determination applies also for $WWtl_{x,y}$, $WWtr_{x,y}$, $Wwbr_{x,y}$.

The calculation of the "bottom left", "top left", "bottom right" and "top right" wedge values can now be recited in the following manner:

For the wedge depicted in FIG. 19A:

$$WBbl_{x,y} = b_{x,y} + F_{left}*WBbl_{x-1,y} + F_{top\_left}*WBbl_{x-1,y-1} - F_{left}*F_{top\_left}*WBbl_{x-2,y-1}.$$

For the wedge depicted in FIG. 19B:

$$WBtl_{x,y}=b_{x,y}+F_{top\_left}*WBtl_{x-1,y-1}+F_{top}*WBtl_{x,y-1}-F_{top\_left}*F_{top}*WBtl_{x-1,y-2}.$$

For the wedge depicted in FIG. 19C:

$$WBtr_{x,y}=b_{x,y}+F_{top}*WBtr_{x,y-1}+F_{top\_right}*WBtr_{x+i,y-1}-F_{top}*F_{top\_right}*WBtr_{x+1,y-2}.$$

For the wedge depicted in FIG. 19D:

$$WBbr_{x,y}=b_{x,y}+F_{top\_right}*WBbr_{x+1,y-1}+F_{right}*WBbr_{x+1,y}-F_{top\_right}*F_{right}*WBbr_{x+2,y-1}.$$

The formulae for $WWbl_{x,y}$, $WWtl_{x,y}$, $WWtr_{x,y}$, and $WWbr_{x,y}$ are similar.

A further embodiment of FFH is provided by altering the type of error measure used to determine the over result value (eg. excess white value) and the under result value (eg. excess black value). In this connection, FIG. 20 illustrates the selection of a halftone output value based on an input pixel value g within the range of 0 (representing no output pixels enabled, and therefore black in a monochrome case) and 1 (representing all pixels enabled, and therefore a white in a monochrome case), for an 8-bit range of input values. A standard error in the actual output value for each of excess white and excess black can be defined as follows:

$$\epsilon_{xb}=1-g$$

$$\epsilon_{xw}=g$$

Given this, a new error measure can be defined as:

$$\varepsilon' = \frac{1}{1-\varepsilon}$$

By defining the new error measure $\epsilon'$, the ratio of the errors can be preserved. In this manner, the modified error for excess black and excess white can be defined as follows:

$$\varepsilon'_{xb} = \frac{1}{1-(1-g)} = \frac{1}{g}$$

$$\varepsilon'_{xw} = \frac{1}{1-g}$$

Using the modified error measure, for images with a constant grey level, there is no change in output results. However, for images with many grey levels, it can be shown that using the modified error measure, on average, the influence of a region of halftoned pixels on a current pixel is independent of the grey level of the region of halftoned pixels.

That is, if the region of halftoned pixels has a grey level $g_1$, then on average, a fraction of $g_1$ of the pixels in the region are turned on and a fraction of $(1-g_1)$ are turned off.

If a pixel of the region is selected at random, the probability that the pixel is on is $g_1$ and the probability that it is off is $(1-g_1)$.

That is, the expected value of excess black error, using the modified error measure, for a pixel of the region of halftoned pixels is:

$$g_1*e'_{xb}=g_1*1/g_1=1.$$

Similarly, the expected value of excess white error, using the modified error measure, for a pixel of the region of halftoned pixels is:

$$(1-g_1)*e'_{xw}=(1-g_1)*1/(1-g_1)=1.$$

That is, the expected influence of pixels in a region of halftoned pixels is independent of the grey level of the region of halftoned pixels. As a result, the modified error measure avoids production of artefacts where the image changes in grey levels.

With the above described embodiments there is no guarantee that the correct number of pixels will be turned on to represent to any particular grey level. It is desirable that the average halftone output grey level is very close to the input grey level.

For the first embodiment of force field halftoning as previously described, denote by FF(g) the average halftone output grey level produced when an image of constant grey level g, where 0<=g<=1, is halftoned.

It is found that FF(g) although close to g, is not very close to g as would be ideal. However, it is found that FF(g) is a monotonic increasing function. That is for 2 grey levels $g_1$, $g_2$ with $g_1<g_2$, then $FF(g_1)<=FF(g_2)$ Also FF(0)=0 and FF(1)=1.

This means there exists an inverse function $FF^{-1}$ which maps from the interval [0.1] onto the interval [0,1] such that $FF(FF^{-1}(g))=g$.

By including a re-mapping of input data in force field halftoning, where each pixel input values, g, is re-mapped to $FF^{-1}(g)$, force field halftoning now has the required property that the average halftone output grey level produced when an image of constant grey level g is halftoned, is very close to g.

In a preferred implementation, the pre-processing of the input pixels can be performed using a look-up table.

A further modification arises from the third embodiment of FFH where the output value of the current pixel is initially determined by the use of a bi-level dither matrix or dot pattern for each input grey level.

The dot patterns for each grey level may or may not be correlated.

This has the advantage that the halftone pattern for each grey level can be optimised while being less constrained by the halftone pattern for other grey levels than is the case with use of a single dither matrix for all grey levels.

Alternatively, the dot pattern for each grey level can be optimised without being constrained at all by the halftone patterns for other grey levels.

This provides an improvement in the halftone pattern achievable for a constant input grey level.

More generally, a further modification arises from the third embodiment of FFH where the output value of the current pixel is initially determined by the use of one of a set of dither matrices where the particular dither matrix used is selected as a function of the image input values in a local neighbourhood of the current pixel.

The above embodiments of FFH have been described with reference to a monochrome output value of the display pixel, having an output value of the black or white color values representative of a pixel being in the totally "off" or totally "on" state respectively. The described embodiments can readily be extended to display devices having a plurality of color components per pixel and/or more than two output levels per color component per pixel, wherein each color component is halftoned independently.

In relation to the third embodiment, two particular notable extensions for color component force field halftoning include the use of an "inverse" dither matrix, and the use of a "displaced" dither matrix. In particular, for a dither matrix D with dither values $d_{i,j}$ and a maximum dither value in D of MAXVAL, an "inverse" dither matrix can be defined as that with dither values:

$$d\_inverse_{i,j} = (MAXVAL - d_{i,j}).$$

Alternatively, for a dither matrix D with dither values $d_{i,j}$ a "displaced" dither matrix can be defined as that with dither values:

$$d\_displaced_{i,j} = d_{(i+offset\_x) modulo\ max\_x, (j+offset\_y) modulo\ max\_y}.$$

Two examples follow for the use of an "inverse" dither matrix and a "displaced" dither matrix for color halftoning.

EXAMPLE 1
RRB Dither Matrix Halftoning

For RGB halftoning, given a dither matrix D with dither values $d_{i,j}$ and a maximum dither value in D of MAXVAL, a dither matrix for the green color component DG with dither values $dg_{i,j} = d_{i,j}$ can be used. For the red and blue color components, a single dither matrix DRB with dither values $drb_{i,j} = MAXVAL - d_{i,j}$ can be used.

EXAMPLE 2
CMYK Dither Matrix Halftoning

For CMYK halftoning, a dither matrix D with dither values $d_{i,j}$ and a maximum dither value in D of MAXVAL, a number of dither matrices can be used, in combination. Firstly, a dither matrix for the black (K) color component DK with dither values $$dk_{i,j} = d_{(i+offset\_x) modulo\ max\_x, (j+offset\_y) modulo\ max\_y}$$

is applied. A dither matrix for the magenta color component DM with dither values $dm_{i,j} = d_{i,j}$ and a dither matrix for the cyan and yellow color components DCY with dither values $dcy_{i,j} = MAXVAL - d_{i,j}$ are also applied.

Implementation

The above described embodiments can be practically implemented in software on a general purpose computer, the software being resident within the computer memory, including magnetic storage (eg. hard and/or floppy disks), optical disks (CD-ROM), volatile RAM, or accessible via a computer network, such as the Internet. In such instances, single images or image sequences can be halftoned and output directly to a multi-level display device (eg, a FLCD) associated with the general purpose computer.

Figure 21:
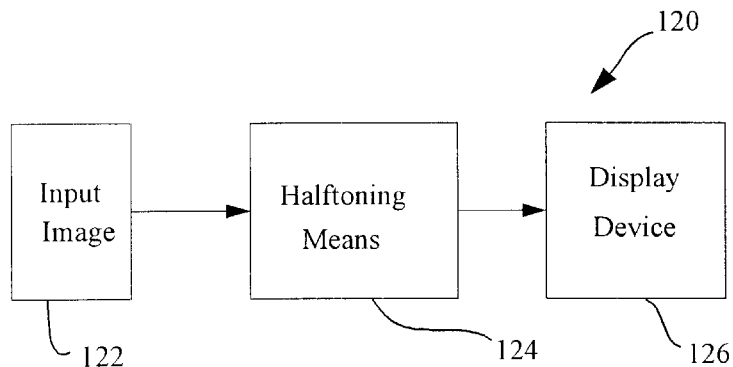
FIG. 21 depicts a generic hardware arrangement for performing the described embodiments.

FIG. 21 illustrates a display system 120 in which an image is displayed on a display device 126. The displayed image is sourced from an input image 122 that is supplied to a halftoning means 124 configured to operate in accordance with the present invention. The halftoning means 124 performs a halftoning operation on the input image so that a halftone output signal is provided to the display device 126. The display device 126 can be an electronic display such as a ferro-electric liquid crystal device, plasma device or other arrangement which has a generally limited number of display levels for which halftoning of an input image is desirable. Alternatively, the display device can be a printer or some other form of hard copy reproducing apparatus, again with a generally limited number of intensity levels. The halftoning means 124 may operate for example to perform any one of "filtered error minimisation halftoning", "force field halftoning", or "cost minimisation mixed with other halftoning" as described herein.

Figure 22:
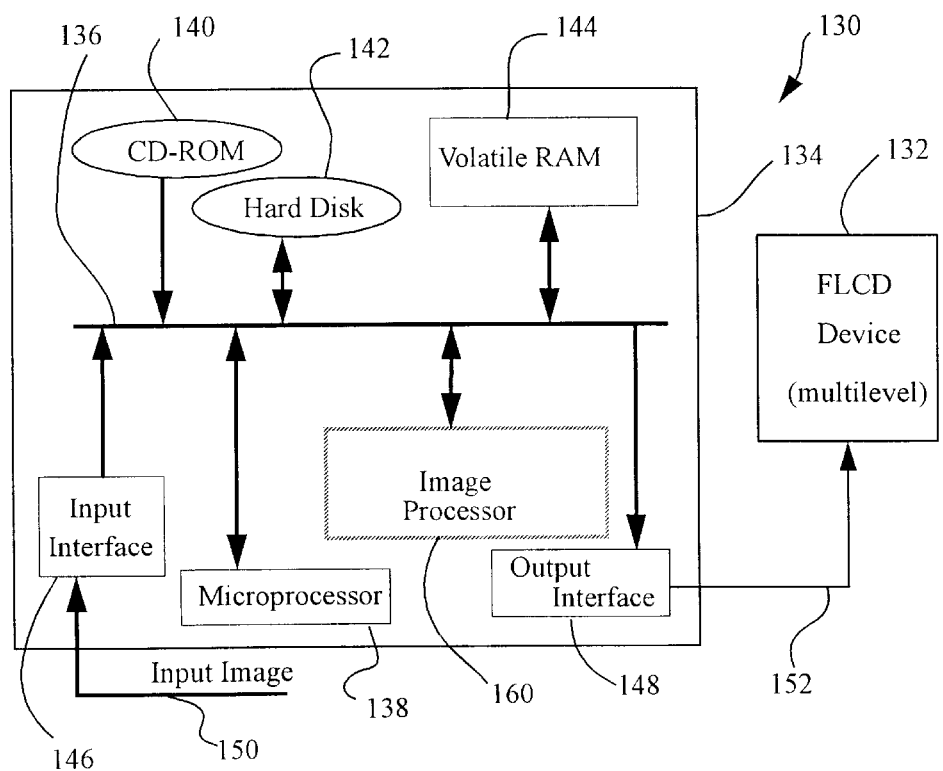
FIG. 22 depicts a computer system operable to perform halftoning according to the described embodiments.

A specific arrangement is illustrated in FIG. 22 which shows a computer system 130 including a computer 134 having an output connected to an FLCD device 132. The computer 134 includes a system bus 136 to which a controlling microprocessor 138 is connected. The computer 134 incorporates a non-volatile random access memory (RAM) in the form of a hard disk 142 and also volatile RAM 144 which is typically formed by semiconductor components. A read only memory (ROM) device, such as a compact disc device (CD-ROM) 140 also connects to the bus to provide a source of information and controlling programs. Coupled to the bus 136 is an input interface 146 via which an input image 150 can be provided to the computer 134. Also connected to the bus 136 is an output interface 148 which connects via a signal line 152 to the FLCD 132. In operation, either one of the CD-ROM 140 or hard disk 142 can incorporate a computer program configured to perform halftoning in accordance an embodiment of the present invention. The computer program is generally loaded from either one of the CD-ROM 140 or the hard disk 142 into the RAM 144 to enable running of the program. An image to be halftoned can be supplied via the input image line 150 or from either one of the CD-ROM 140 or the hard disk 142. The microprocessor 138 can, via the program, perform force field halftoning of the image. Depending upon the rate at which the computer program performs halftoning, the halftoned image can be stored in a frame memory, comprising for example part of the volatile RAM 144 and, once the entire image has been halftoned, the entire image can be transferred to the output interface 148 for display on the FLCD 132. Alternatively, where processing speed permits, the microprocessor 138 can perform halftoning and via the output interface to directly output halftoned pixel values to the FLCD 132 whilst using the RAM 144 as intermediate storage for the various variables and the like used in the geometrically reducing processing and halftone calculations described above.

An alternative arrangement is also seen in FIG. 22 where an optional image processor 160 connects to the bus 136 and which, under control of the microprocessor 138, is configured to perform specific image processing calculations, and operations. according to the invention, such a geometrically reducing weight processing, force field halftoning for example in hardware thus releasing the microprocessor 138 from complicated calculations and thus permitting it to perform other management operations necessary for the control of the system 130.

Appendix A provides a computer program listing written in C, for an implementation cost minimisation mixed with dithering. The program of Appendix A involves the 1-dimensional inverse halftoning table of Appendix B for use in the preprocessing re-mapping of input values to output intensity values (ie. $ht^{-1}[g]$), described above.

Appendix C and Appendix D, the disclosure of which are incorporated herein, illustrate computer code written in C for a software implementation of two level (black and white) force field halftoning performed in accordance with the present invention. Appendix C in particular includes a map for pre-processing image input data used in the program listing specified in Appendix D, the latter describing the specific implementation that may be performed in the computer 134.

Arrangements such as those shown in FIG. 22 can be useful in computing and other applications where the image update time is not crucial to system performance.

However, particularly for the display of image sequences, a software implementation of the present invention may not be sufficiently fast so as to achieve real-time image display (eg. 25 frames per second in the PAL color system). Further, in some applications such as portable personal computers and the like, it is desirable that a practical implementation of the present invention be interchangeable with standard hardware used in such applications. Accordingly, incorporation of an embodiment of the invention into the discrete level display device is advantageous.

Figure 23:
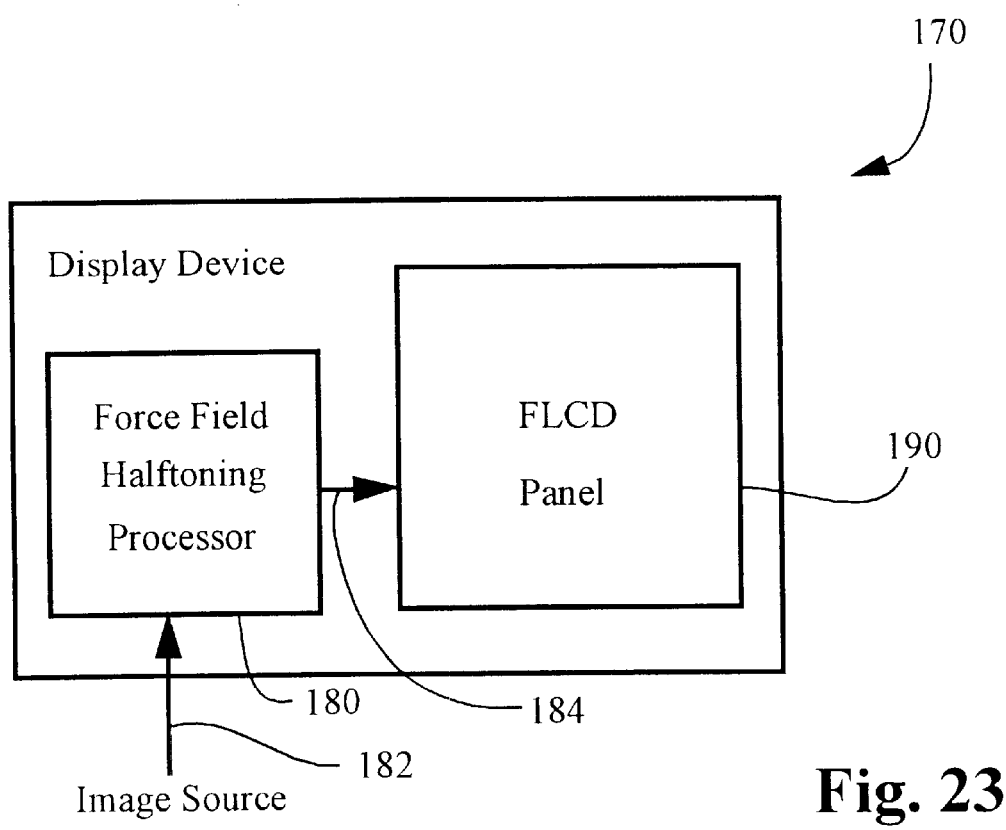
FIG. 23 depicts a display system operable according to the described embodiments.

FIG. 23 shows a display device 170 including an FLCD display panel 190 supplied with halftoned pixel data from a force field halftoning processor 180. The processor 180 is input with (substantially continuous tone) pixel data 182 derived from a suitable source of such data including a video device, such as a television receiver, or a general purpose computer, for example.

FIG. 24 illustrates an exemplary embodiment of a force field halftoning processor 200, the general configuration of which may be applied to a number of the embodiments described above. In FIG. 24, a stream of pixel input values 202 are supplied to a pixel result calculator 204. The calculator 204 provides a pixel halftone output value 206, representing a display output of the processor 200. The calculator 204 also outputs pixel excess values via a line 208 to a pixel result serial memory 210 and also to a left wedges calculator 212. The left wedges calculator 212 determines black and white left wedge excess values which are output 224 to a left wedges serial memory 226. The memory 226 includes a return line 228 to the left wedges calculator 212, and an output line 230 to the pixel result calculator 204. The pixel result serial memory 210 includes an output 213 that supplies an input to a right wedges calculator 214. The right wedges calculator 214 determines black and white right wedge excess values which are output 216 to a right wedges serial memory 218. The serial memory 218 includes two outputs, a first output 222 which supplies a further input of the right wedges calculator 219, and a second output 220 which supplies both a further input of the right wedges serial memory 218 and also a further input of the pixel result calculator 204.

Each of the memories 210, 226 and 218 incorporate a "direction" input which is supplied with a signal 232 representing the calculation direction being performed on the particular forward or reverse pass as noted above. When the signal 232 is a logical 1 (forward pass), the left wedges serial memory 226 shifts from left to right, and both the right wedges serial memory 218 and the pixel result serial memory 210 shift from left to right. When the signal 232 is a logical 0 (reverse pass), the left wedges serial memory 226 does not shift and both the right wedges serial memory 218 and the pixel result serial memory 210 shift from right to left.

Appendix E, the disclosure of which is incorporated herein, indicates pseudocode descriptive of the operation of FIG. 24, and refers to the various input and output signals that apply throughout the processor 200 and for each of the calculators 204, 212 and 214 in a specific monochrome halftoning process. The various calculations are consistent with the description above for the "wedges" embodiment, but alternatively can be modified to apply to the "quadrant" embodiment described above.

The processor 200 is advantageous in that its structure permits receipt of a serial pixel stream as input and provides a corresponding pixel output stream in a form ready for display and in reliance only upon a controlling forward/reverse pass signal 232 in order to control the direction of halftoning. Further, because each of the calculators 204, 212 and 218 only perform additions and multiplications, such can be configured in silicon at gate level thereby permitting real-time operation and hence the display of image sequences without any noticeable delay due to the halftoning process.

Conclusion

It will be apparent from the foregoing, that the processing of pixel-based images using geometrically reducing influences provides for reductions in display errors, particularly for halftoned displays, by gathering the results of processing from a wide neighbourhood of a current pixel in an efficient and accurate manner.

The foregoing describes only a number of embodiments of the present invention, and modifications, obvious to those skilled in the arc, can be made thereto without departing from the spirit and scope of the present invention.

APPENDIX A

```
#define EM_WEDGES_3LINESTORES_RT_PIXELS    5
#define EM_WEDGES_3LINESTORES_SHARPEN_FACTOR    1
void
em_wedges_3linestores
(
    int16           **from_plane,
    int16           **to_plane,
    int             y_max,
    int             x_max
)
{
    int             g;      /* grey level 0 <= 9 <= 255 */
    float           Fth[256];
#ifdef EM_W3LS_DITH
/*
    static double   fth = 0;
*/
    static double   fth = 0.0008;
/* too noisy
    static double   fth = 0.005;
*/
#endif
    static double   fx = 1.0 / 2;
/*
    static double   fz = 0.375214227;
*/
    static double   fz = 3.0 / 8;
    double          flr;
    int             x,y,to_val;
    int             to_val_dith, to_val_alt;
    int             dither_val;
    int             ifrom_val;
    double          from_val;
    double          abs_error_255, abs_error_0;
    double          abs_error_dith, abs_error_alt;
    double          etemp;
    double          e_wedge_left;
                    /* lower left wedge – apex at (x-2,y-1) */
    double          e_line_left; /* left line sum – apex at (x-1,y) */
    double          edl;
    double          edr;
    double          eup;
    double          e_in;
    double          e_out;
    int             i;
    double          **edl_plane;    /* diagonal line left */
    double          **edr_plane;    /* diagonal line right */
    double          **eup_plane;    /* quadrant above (up) */
    edl_plane = (double **) malloc(y_max * sizeof(double *));
    edr_plane = (double **) malloc(y_max * sizeof(double *));
    eup_plane = (double **) malloc(y_max * sizeof(double *));
    for (y = 0; y < y_max; y++)
    {
        edl_plane[y] = (double *) malloc(x_max * sizeof(double));
        edr_plane[y] = (double *) malloc(x_max * sizeof(double));
        eup_plane[y] = (double *) malloc(x_max * sizeof(double));
```

APPENDIX A-continued

```
}
#ifdef EM_W3LS_DITH
    for (g = 0; g < 256; g++)
    {
        Fth[g] = fth * 9 * (255 - g);
    }
#endif
    for(y=0;y<y_max;++y)
    for(x=0;x<x_max;++x)
    {
        edl_plane[y][x] = 0;
        edr_plane[y][x] = 0;
        eup_plane[y][x] = 0;
    }
    for(y=0;y<y_max;++y)
    {
        e_line_left = 0;
        e_wedge_left = 0;
        for(x=0;x<x_max;++x)
        {
            ifrom_val = from_plane[y][x];
            from_val = from_plane[y][x];
            edl = 0;
            edr = 0;
            eup = 0;
            e_in = e_line_left = fz * e_wedge_left;
            if (y > 0)
            {
                if (x > 0)
                {
                    etemp = fz * edl_plane[y-1][x-1];
                    edl = etemp;
                    eup += etemp;
                    e_in += etemp;
                }
                etemp = fx * eup_plane[y-1][x];
                eup += etemp;
                e_in = etemp;
                if (x < x_max - 1)
                {
                    etemp = fz * edr_plane[y-1][x+1];
                    edr = etemp;
                    eup += etemp;
                    e_in += etemp;
                }
                flr = fz;
                for (i = 1; i <
                    EM_WEDGES_3LINESTORES_RT_PIXELS;
                    i++)
                {
                    if ((x + 1 + i) >= x_max - 1)
                    {
                        break;
                    }
                    flr *= fx;
                    e_in += flr * edr_plane[y-1][x + 1 + j];
                }
            }
            if (from_val == 255)
            {
                to_val = 255;
            }
            else if (from_val ==0)
            {
                to_val = 0;
            }
            else
            {/* 0 < from_val < 255 */
#ifdef USE_INVHT_LUT
                from_val = invht[(int) from_val];
#endif
                abs_error_255 = fabs(e_in +
                    EM_WEDGES_3LINESTORES_SHARPEN_FACTOR *
                    (from_val - 255));
                abs_error_0 = fabs(e_in +
                    EM_WEDGES_3LINESTORES_SHARPEN_FACTOR *
                    (from_val - 0));
#ifdef EM_W3LS_DITH
                dither_val = dither_cell[y%(64)][x%(64)];
```

APPENDIX A-continued

```
#define EM_W3LS_DITH_COLOR
#ifdef EM_W3LS_DITH_COLOR
                if (plane == 1)  /* green */
                {
                    dither_val = 254-dither_val;
                }
#endif
                if (from_val > dither_val)
                {
                    to_val_dith = 255;
                    to_val_alt = 0;
                }
                else
                {
                    to_val_dith = 0;
                    to_val_alt = 255;
                }
                abs_error_dith = fabs(e_in +
                    EM_WEDGES_3LINESTORES_SHARPEN_FACTOR
                    * (from_val - to_val_dith));
                abs_error_alt = fabs(e_in +
                    EM_WEDGES_3LINESTORES_SHARPEN_FACTOR
                    * (from_val - to_val_alt));
                if (abs_error_dith < abs_error_alt + Fth[ifrom_val])
                {
                    to_val = to_val_dith;
                }
                else
                {
                    to_val = to_val_alt;
                }
else
                if (abs_error_255 < abs_error_0)
                {
                    to_val = 255;
                }
                else
                {
                    to_val = 0;
                }
#endif
            } /* 0 < from_val < 255 */
            to_plane[y][x] = to_val;
            e_out = from_val - to_val;
            if ((y > 0) && (x > 0))
            {
                e_wedge_left += edl_plane[y-1][x-1];
            }
            e_wedge_left *= fx;
            e_line_left += e_out;
            e_line_left *= fx;
            edl += e_out;
            edr += e_out;
            eup += e_out;
            edl_plane[y][x] = edl;
            edr_plane[y][x] = edr;
            eup_plane[y][x] = eup;
        }
    }
    for (y = 0; y < y_max; y++)
    {
        free(edl_plane[y]);
        free(edr_plane[y]);
        free(eup_plane[y]);
    }
    free(edl_plane);
    free(edr_plane);
    free(eup_plane);
}
```

APPENDIX B

```
/* em_wedges_3linestores dith with threshold 0
 * fx = 1/2 fz = 3/8 (sharpen factor: 1)
 */
static float invht[256] =
```

APPENDIX B-continued

```
{
0.000000, /* 0 */
19.439392, /* 1 */
19.439392, /* 2 */
19.532776, /* 3 */
19.688416, /* 4 */
19.968567, /* 5 */
20.248718, /* 6 */
20.684509, /* 7 */
21.151428, /* 8 */
21.680603, /* 9 */
22.209778, /* 10 */
22.614441, /* 11 */
23.392639, /* 12 */
24.326477, /* 13 */
24.917908, /* 14 */
25.789490, /* 15 */
26.256409, /* 16 */
27.221375, /* 17 */
27.781677, /* 18 */
28.933411, /* 19 */
29,400330, /* 20 */
29.587097, /* 21 */
31.797180, /* 22 */
31.797180, /* 23 */
32.762146, /* 24 */
33.291321, /* 25 */
33.976135, /* 26 */
34.816589, /* 27 */
35.781555, /* 28 */
36.684265, /* 29 */
37.493591, /* 30 */
38.240662, /* 31 */
39.361267, /* 32 */
40.513000, /* 33 */
41,104431, /* 34 */
42.007141, /* 35 */
42.909851, /* 36 */
44.061584, /* 37 */
44.746399, /* 38 */
45.462341, /* 39 */
46.302795, /* 40 */
46.520691, /* 41 */
48.357239, /* 42 */
49.197693, /* 43 */
50.785217, /* 44 */
52.590637, /* 45 */
53.057556, /* 46 */
54.053650, /* 47 */
54.333801, /* 48 */
55.205383, /* 49 */
55.890198, /* 50 */
56.668396, /* 51 */
56.948547, /* 52 */
58.318176, /* 53 */
59.189758, /* 54 */
59.718933, /* 55 */
60.808411, /* 56 */
61,462097, /* 57 */
62.458191, /* 58 */
63.734436, /* 59 */
65.010681, /* 60 */
65.539856, /* 61 */
66.442566, /* 62 */
67.033997, /* 63 */
69.026184, /* 64 */
70.053406, /* 65 */
70.240173, /* 66 */
73.259583, /* 67 */
73.352966, /* 68 */
73.944397, /* 69 */
74.629211, /* 70 */
75.251770, /* 71 */
75.812073, /* 72 */
76.590271, /* 73 */
77.586365, /* 74 */
78.520203, /* 75 */
79.454041, /* 76 */
80.232239, /* 77 */
81.197205, /* 78 */
81.944275, /* 79 */
82.753601, /* 80 */
83.469543, /* 81 */
83.625183, /* 82 */
83,656311, /* 83 */
83.656311, /* 84 */
88.979187, /* 85 */
88.979187, /* 86 */
89.539490, /* 87 */
90.130920, /* 88 */
91.127014, /* 89 */
91.905212, /* 90 */
92.652283, /* 91 */
93.399353, /* 92 */
94.239807, /* 93 */
95.267029, /* 94 */
96.076355, /* 95 */
97.134705, /* 96 */
97.944031, /* 97 */
98.722229, /* 98 */
99.531555, /* 99 */
100.122986, /* 100 */
100.776672, /* 101 */
101.601562, /* 102 */
104.107361, /* 103 */
104.263000, /* 104 */
104.916687, /* 105 */
106.628723, /* 106 */
107.904968, /* 107 */
108.309631, /* 108 */
108,776550, /* 109 */
109.803772, /* 110 */
110.830994, /* 111 */
111.578064, /* 112 */
112.480774, /* 113 */
113.414612, /* 114 */
114.099426, /* 115 */
115.033264, /* 116 */
115.873718, /* 117 */
116.620789, /* 118 */
117.181091, /* 119 */
117.959290, /* 120 */
118,114929, /* 121 */
119.391174, /* 122 */
119.795837, /* 123 */
120.449524, /* 124 */
121.570129, /* 125 */
121.694641, /* 126 */
121.850281, /* 127 */
133.149719, /* 128 */
133.305359, /* 129 */
133.429871, /* 130 */
134.550476, /* 131 */
135.204163, /* 132 */
135.608826, /* 133 */
136.885071, /* 134 */
137.040710, /* 135 */
137.818909, /* 136 */
138.379211, /* 137 */
139.126282, /* 138 */
139.966736, /* 139 */
140.900574, /* 140 */
141.585388, /* 141 */
142.519226, /* 142 */
143.421936, /* 143 */
144.169006, /* 144 */
145.196228, /* 145 */
146.223450, /* 146 */
146.690369, /* 147 */
147.095032, /* 148 */
148.371277, /* 149 */
150.083313, /* 150 */
150.737000, /* 151 */
150.892639, /* 152 */
153.398438, /* 153 */
154.223328, /* 154 */
154.877014, /* 155 */
155.468445, /* 156 */
```

APPENDIX B-continued

```
156.277771, /* 157 */
157.055969, /* 158 */
157.865295, /* 159 */
158.923645, /* 160 */
159.732971, /* 161 */
160.760193, /* 162 */
161.600647, /* 163 */
162.347717, /* 164 */
163.094788, /* 165 */
163.872986, /* 166 */
164.869080, /* 167 */
165.460510, /* 168 */
166.020813, /* 169 */
166.020813, /* 170 */
171.343689, /* 171 */
171.343689, /* 172 */
171.374817, /* 173 */
171.530457, /* 174 */
172.246399, /* 175 */
173.055725, /* 176 */
173.802795, /* 177 */
174.767761, /* 178 */
175.545959, /* 179 */
176.479797, /* 180 */
177.413635, /* 181 */
178.409729, /* 182 */
179.187927, /* 183 */
179.748230, /* 184 */
180.370789, /* 185 */
181.055603, /* 186 */
181.647034, /* 187 */
181.740417, /* 188 */
184.759827, /* 189 */
184.946594, /* 190 */
185.973816, /* 191 */
187.966003, /* 192 */
188.557434, /* 193 */
189.460144, /* 194 */
189.989319, /* 195 */
191.265564, /* 196 */
192.541809, /* 197 */
193.537903, /* 198 */
194.191589, /* 199 */
195.281067, /* 200 */
195.810242, /* 201 */
196.681824, /* 202 */
198.051453, /* 203 */
198.331604, /* 204 */
199.109802, /* 205 */
199.794617, /* 206 */
200.666199, /* 207 */
200.946350, /* 208 */
201.942444, /* 209 */
202.409363, /* 210 */
204.214783, /* 211 */
205.802307, /* 212 */
206.642761, /* 213 */
208.479309, /* 214 */
208.697205, /* 215 */
209.537659, /* 216 */
210.253601, /* 217 */
210.938416, /* 218 */
212.090149, /* 219 */
212.992859, /* 220 */
213.895569, /* 221 */
214.487000, /* 222 */
215.638733, /* 223 */
216.759338, /* 224 */
217.506409, /* 225 */
218.315735, /* 226 */
219.218445, /* 227 */
220.183411, /* 228 */
221.023865, /* 229 */
221.708679, /* 230 */
222.237854, /* 231 */
223.202820, /* 232 */
223.202820, /* 233 */
225.412903, /* 234 */
225.599670, /* 235 */
226.066589, /* 236 */
227.218323, /* 237 */
227.778625, /* 238 */
228.743591, /* 239 */
229.210510, /* 240 */
230.082092, /* 241 */
230.673523, /* 242 */
231.607361, /* 243 */
232.385559, /* 244 */
232.790222, /* 245 */
233.319397, /* 246 */
233.848572, /* 247 */
234.315491, /* 248 */
234.751282, /* 249 */
235.031433, /* 250 */
235.311584, /* 251 */
235.467224, /* 252 */
235.560608, /* 253 */
235.560608, /* 254 */
255.000000  /* 255 */
};
```

APPENDIX C

```
/*
  inverse force field map for 2 level halftoning
  static float fx = 3.0 / 8;
*/
float invFF_2v_3o8[256] =
{
0.000000,
1.000228,
1.000228,
2.000213,
4.001641,
6.229234,
8.468013,
10.000091,
13.000045,
15.541348,
18.047147,
20.385146,
22.395329,
23.999877,
27.781920,
27.781920,
30.361161,
32.000241,
34.365964,
36.899972,
38.000150,
43.000073,
43.000073,
43.932452,
45.899348,
46.000028,
46.466947,
47.000012,
49.647832,
51.660447,
51.999936,
53.999906,
55.999875,
55.999875,
57.301898,
58.999829,
60.999799,
61.549888,
61.999784,
62.815433,
62.999768,
62.999768,
66.000209,
71.013265,
71.863933,
72.972865,
```

APPENDIX C-continued 73.000102,
73.000102,
73.248639,
74.000087,
74.371190,
75.056491,
75.964065,
76.000056,
77.067647,
77.797694,
78.474240,
79.000010,
79.590468,
79.954762,
80.039392,
80.663409,
80.999980,
80.999980,
83.563170,
89.999843,
89.999843,
90.999827,
92.317414,
92.317414,
92.341247,
92.396693,
92.999797,
92.999797,
92.999797,
96.375718,
96.657815,
96.867929,
97.793012,
98.514304,
99.695220,
99.942784,
100.000176,
100.417972,
101.000161,
101.601562,
102.015710,
103.000131,
103.206353,
104.000115,
104.277835,
105.000100,
105.524898,
106.000085,
106.138701,
106.988883,
107.672238,
108.000054,
108.812299,
109.000039,
109.103150,
109.620166,
110.987849,
111.818089,
111.999993,
112.920213,
113.471274,
114.556375,
114.856954,
114.999948,
115.778146,
115.999932,
116.619573,
117.119565,
117.570434,
117.999902,
118.469253,
118.999887,
118.999887,
119.174981,
119.320407,
119.325271,
120.999856,
120.999856,
121.816478, APPENDIX C-continued 121.816478,
121.838851,
121.838851,
133.161149,
133.161149,
133.183522,
133.183522,
134.000144,
134.018626,
135.674729,
135.674729,
135.855174,
136.000113,
136.014218,
136.780744,
137.000098,
137.452912,
138.000083,
138.329844,
138.993745,
139.281678,
140.000052,
140.143046,
140.443625,
141.528726,
142.314219,
143.000007,
143.124032,
144.055438,
145.350652,
145.813193,
145.999961,
146.181378,
146.999946,
147.354512,
148.109365,
148.898263,
148.999915,
149.413819,
149.999900,
150.547071,
150.997939,
151,934695,
152.011542,
152.898688,
153.398438,
153.999839,
154.643798,
154.999824,
155.051866,
155.295053,
157.513404,
157.635970,
157.895207,
158.330512,
158.654923,
159.823680,
161.000218,
161.000218,
161.000218,
161.019673,
161.200118,
163.000188,
164.000173,
165.000157,
165.000157,
170.000081,
174.000020,
174.000020,
174.249530,
174.961581,
175.046210,
175.419745,
175.999990,
176.247554,
177.013593,
177.934299,
178.285460,
178.999944,

APPENDIX C-continued

```
        179.910922,
        180.133681,
        180.999913,
        181.521792,
        181.999898,
        181.999898,
        182.027135,
        183.136067,
        183.986735,
        188.999791,
        192.000232,
        192.000232,
        192.205968,
        192.942338,
        193.401961,
        194.068294,
        196.000171,
        197.698102,
        199.000125,
        199.000125,
        201.000094,
        202.675166,
        203.339553,
        205.076394,
        208.200860,
        208.553481,
        208.999972,
        209.100652,
        211.057820,
        211.999927,
        211.999927,
        216.999850,
        218.125319,
        220.569835,
        223.073688,
        224.000230,
        227.218080,
        228.308530,
        231.000123,
        232.771497,
        234.612908,
        237.034078,
        239.931893,
        241.999955,
        244.999909,
        245.999894,
        248.999848,
        251.079097,
        252.999787,
        253.999772,
        253.999772,
        255.000000
        };
```

APPENDIX D

```
/*
 * source code for 2 level halftoning
 */
void
ff_pixel_2level
(
    int16       **from_plane,
    int16       **to_plane,
    int         y_max,
    int         x_max
)
{
    int g;      /* grey level 0 <= g <= 255 */
    float Fminusth[256];
    float Fplusth[256];
#ifdef FF_CC_DITH
    static double fth = 0.0005;
#endif
    static double fx = 3.0 / 8;
    static double fy = 3.0 / 8;
```

APPENDIX D-continued

```
    static double fz = 0.249798163;
    static double fxz = 0.093674311;
    static double fyz = 0.093674311;
    int x,y,to_val;
    int dither_val;
    int ifrom_val;
    double from_val;
    double from_xb, from_xw;
    double s_xb, s_xw;
    double force_diff;
    double force_minus_th;
    double force_plus_th;
    double xb, xw;
    double xbll;
    double xwll;
    double xbul;
    double xwul;
    double xblr;
    double xwlr;
    double xbur;
    double xwur;
    double xb_in, xw_in;
    double e_out;
    double **xbll_plane;
    double **xwll_plane;
    double **xbul_plane;
    double **xwul_plane;
    double **xblr_plane;
    double **xwlr_plane;
    double **xbur_plane;
    double **xwur_plane;
    double **e_plane;
    xbll_plane = (double **) malloc(y_max * sizeof(double *));
    xwll_plane = (double **) malloc(y_max * sizeof(double *));
    xbul_plane = (double **) malloc(y_max * sizeof(double *));
    xwul_plane = (double **) malloc(y_max * sizeof(double *));
    xblr_plane = (double **) malloc(y_max * sizeof(double *));
    xwlr_plane = (double **) malloc(y_max * sizeof(double *));
    xbur_plane = (double **) malloc(y_max * sizeof(double *));
    xwur_plane = (double **) malloc(y_max * sizeof(double *));
    e_plane = (double **) malloc(y_max * sizeof(double *));
    for (y = 0; y < y_max; y++)
    {
        xbll_plane[y] = (double *) malloc(x_max * sizeof(double));
        xwll_plane[y] = (double *) malloc(x_max * sizeof(double));
        xbul_plane[y] = (double *) malloc(x_max * sizeof(double));
        xwul_plane[y] = (double *) malloc(x_max * sizeof(double));
        xblr_plane[y] = (double *) malloc(x_max * sizeof(double));
        xwlr_plane[y] = (double *) malloc(x_max * sizeof(double));
        xbur_plane[y] = (double *) malloc(x_max * sizeof(double));
        xwur_plane[y] = (double *) malloc(x_max * sizeof(double));
        e_plane[y] = (double *) malloc(x_max * sizeof(double));
    }
#ifdef FF_CC_DITH
    Fminusth[0] = 0;
    Fplusth[0] = 0;
    for (g = 1; g < 255; g++)
    {
        Fminusth[g] = - fth / g;
        Fplusth[g] = fth / (255 - g);
    }
#endif
    for(y=0;y<y_max;++y)
    for(x=0;x<x_max;++x)
    {
        xbll_plane[y][x] = 0;
        xwll_plane[y][x] = 0;
        xbul_plane[y][x] = 0;
        xwul_plane[y][x] = 0;
        xblr_plane[y][x] = 0;
        xwlr_plane[y][x] = 0;
        xbur_plane[y][x] = 0;
        xwur_plane[y][x] = 0;
        e_plane[y][x] = 0;
    }
    for(y=0;y<y_max;++y)
    {
        for(x=0;x<x_max;++x)
        {
```

APPENDIX D-continued

```
    ifrom_val = from_plane[y][x];
    from_val = from_plane[y][x];
    xbll = 0;
    xwll = 0;
    xbul = 0;
    xwul = 0;
    xblr = 0;
    xwlr = 0;
    xbur = 0;
    xwur = 0;
    xb_in = 0;
    xw_on = 0;
    if (x > 0)
    {
      xb = fx * xbll_plane[y][x-1];
      xbll += xb;
      xw = fx * xwll_plane[y][x-1];
      xwll += xw;
      xb_in += xb;
      xw_in += xw;
    }
    if (y > 0)
    {
      if (x > 1)
      {
        xbll -= fxz * xbll_plane[y-1][x-2];
        xwll -= fxz * xwll_plane[y-1][x-2];
      }
      if (x > 0)
      {
        xbll += fz * xbll_plane[y-1][x-1];
        xwll += fz * xwll_plane[y-1][x-1];
        xb = fz * xbul_plane[y-1][x-1];
        xbul += xb;
        xw = fz * xwul_plane[y-1][x-1];
        xwul += xw;
        xb_in += xb;
        xw_in += xw;
      }
      xbul += fy * xbul_plane[y-1][x];
      xwul += fy * xwul_plane[y-1][x];
      xb_in += fy * xbur_plane[y-1][x];
      xw_in += fy * xwur_plane[y-1][x];
      if (x < x_max - 1)
      {
        xb_in += fz * xblr_plane[y-1][x+1];
        xw_in += fz * xwlr_plane[y-1][x+1];
      }
    }
    if (y > 1)
    {
      if (x > 0)
      {
        xbul -= fyz * xbul_plane[y-2][x-1];
        xwul -= fyz * xwul_plane[y-2][x-1];
      }
    }
    from_val = invFF_2v_3o8[(int) from_val];
    from_xb = from_val;
    from_xw = 255 - from_val;
    if (from_xb > 0)
    {
      s_xb = (float) 1 / (255 - from_xb);
    }
    else
    {
      s_xb = 0;
    }
    if (from_xw > 0)
    {
      s_xw = (float) 1 / (255 - from_xw);
    }
    else
    {
      s_xw = 0;
    }
    force_diff = xb_in * s_xb - xw_in * s_xw;
#ifdef FF_CC_DITH
    force_minus_th = Fminusth[ifrom_cal];
    force_plus_th = Fplusth[ifrom_val];
    if (force_minus_th <= force_diff &&
        force_diff <= force_plus_th)
    {
      dither_val = dither_cell[y % (64)][x % (64)];
#define FF_DITH_COLOR
#ifdef FF_DITH_COLOR
      if (plane == 1) /* green */
      {
        dither_val = 254-dither_val;
      }
#endif
      if (from_val > dither_val)
      {
        to_val = 255;
      }
      else
      {
        to_val = 0;
      }
    }
    else if (force_diff >= 0)
#else
    if (force_diff >= 0)
#endif
    {
      to_val = 255;
    }
    else
    {
      to_val = 0;
    }
    to_plane[y][x] = to_val;
    e_out = from_val - to_val;
    if (e_out > 0)
    {
      e_out = (float) 1 / (255 - e_out);
    }
    else if (e_out < 0)
    {
      e_out = -(float) 1 / (255 + e_out);
    }
    e_plane[y][x] = e_out;
    if (e_out > 0)
    {
      xbll += e_out;
      xbul += e_out;
    }
    else
    {
      xwll -= e_out;
      xwul -= e_out;
    }
    xbll_plane[y][x] = xbll;
    xwll_plane[y][x] = xwll;
    xbul_plane[y][x] = xbul;
    xwul_plane[y][x] = xwul;
  }
  for(x=x_max-1;x<=0;--x)
  {
    e_out = e_plane[y][x];
    if (e_out > 0)
    {
      xblr = e_out;
      xwlr = 0;
      xbur = e_out;
      xwur = 0;
    }
    else
    {
      xblr = 0;
      xwlr = -e_out;
      xbur = 0;
      xwur = -e_out;
    }
    if (x < x_max - 1)
    {
      xblr += fx * xblr_plane[y][x+1];
      xwlr += fx * xwlr_plane[y][x+1];
```

APPENDIX D-continued

```
    }
    if (y > 0)
    {
      if (x < x_max - 2)
      {
        xblr -= fxz * xblr_plane[y-1][x+2];
        xwlr -= fxz * xwlr_plane[y-1][x+2];
      }
      if (x < x_max - 1)
      {
        xblr += fz * xblr_plane[y-1][x+1];
        xwlr += fz * xwlr_plane[y-1][x+1];
        xbur += fz * xbur_plane[y-1][x+1];
        xwur += fz * xwur_plane[y-1][x+1];
      }
      xbur += fy * xbur_plane[y-1][x];
      xwur += fy * xwur_plane[y-1][x];
    }
    if (y > 0)
    {
      if (x < x_max - 1)
      }
        xbur -= fyz * xbur_plane[y-2][x+1];
        xwur -= fyz * xwur_plane[y-2][x+1];
      }
    }
    xblr_plane[y][x] = xblr;
    xwlr_plane[y][x] = xwlr;
    xbur_plane[y][x] = xbur;
    xwur_plane[y][x] = xwur;
  }
}
for (y = 0; y < y_max; y++)
{
  free(xbll_plane[y]);
  free(xwll_plane[y]);
  free(xbul_plane[y]);
  free(xwul_plane[y]);
  free(xblr_plane[y]);
  free(xwlr_plane[y]);
  free(xbur_plane[y]);
  free(xwur_plane[y]);
  free(e_plane[y]);
}
free(xbll_plane);
free(xwll_plane);
free(xbul_plane);
free(xwul_plane);
free(xblr_plane);
free(xwlr_plane);
free(xbur_plane);
free(xwur_plane);
free(e_plane);
}
```

APPENDIX E

Pixel Calculator
  Pixel calculator input:
    /* pixel input value */
    i[x][y]
    /* left wedge values */
    WBbl[x-1][y], WBtl[x-1][y-1]
    WWbl[x-1][y], WWtl[x-1][y-1]
    /* right wedge values */
    WBtr[x][y-1], WBbr[x+1][y-1]
    WWtr[x][y-1], WWbr[x+1][y-1]
  Pixel calculator output:
    /* pixel halftone output value */
    o[x][y]
    /* pixel excess black value */
    b[x][y]
    /* pixel excess white value */
    w[x][y]

APPENDIX E-continued

Pixel calculator pseudo-code description:
    b = i[x][y]
    w = 255 - i[x][y]
    Fb = Fleft * WBbl[x-1][y] + Ftop_left * WBtl[x-1][y-1] +
         Ftop * WBtr[x][y-1] + Ftop_right * WBbr[x+1][y-1]
    Fb = Fb * b
    Fw = Fleft * WWbl[x-1][y] + Ftop_left * WWtl[x-1][y-1] +
         Ftop * WWtr[x][y-1] + Ftop_right * WWbr[x+1][y-1]
    Fw = Fw * w
    if (Fb >= Fw)
    {
      o[x][y] = 255
      b[x][y] = 0
      w[x][y] = w
    }
    else
    {
      o[x][y] = 0
      b[x][y] = b
      w[x][y] = 0
    }
Left wedges calculator
  Left wegdes calculator input:
    /* pixel excess black value */
    b[x][y]
    /* pixel excess white value */
    w[x][y]
    /* left wedge excess black values */
    WBbl[x-1][y], WBbl[x-1][y-1], WBbl[x-2][y-1]
    WBtl[x-1][y-1], WBtl[x][y-1], WBtl[x-1][y-2]
    /* left wedge excess white values */
    WWbl[x-1][y], WWbl[x-1][y-1], WWbl[x-2][y-1]
    WWtl[x-1][y-1], WWtl[x][y-1], WWtl[x-1][y-2]
  Left wedges calculator output:
    /* left wedge excess black values */
    WBbl[x][y], WBtl[x][y]
    /* left wedge excess white values */
    WWbl[x][y], WWtl[x][y]
  Left wedges calculator pseudo-code description:
    WBbl[x][y] = b[x][y] + Fleft * WBbl[x-1][y] +
         Ftop_left * WBbl[x-1][y-1] -
         Fleft * top_left * WBbl[x-2][y-1]
    WBtl[x][y] = b[x][y] + Ftop_left * WBtl[x-1][y-1] +
         Ftop * WBtl[x][y-1] -
         Ftop_left * Ftop * WBtl[x-1][y-2]
    WWbl[x][y] = w[x][y] + Fleft * WWbl[x-1][y] +
         Ftop_left * WWbl[x-1][y-1] -
         Fleft * top_left * WWbl[x-2][y-1]
    WWtl[x][y] = w[x][y] + Ftop_left * WWtl[x-1][y-1] +
         Ftop * WWtl[x][y-1] -
         Ftop_left * Ftop * WWtl[x-1][y-2]
    /* pixel excess black value */
    b[x][y]
    /* pixel excess white value */
    w[x][y]
    /* right wedge excess black values */
    WBtr[x][y-1], WBtr[x+1][y-1], WBtr[x+1][y-2]
    WBbr[x+1][y-1], WBbr[x+1][y], WBbr[x+2][y-1]
    /* right wedge excess white values */
    WWtr[x][y-1], WWtr[x+1][y-1], WWtr[x+1][y-2]
    WWbr[x+1][y-1], WWbr[x+1][y], WWbr[x+2][y-1]
Right wedges calculator output:
    /* right wedge excess black values */
    WBtr[x][y], WBbr[x][y]
    /* right wedge excess white values */
    WWtr[x][y], WWbr[x][y]
  Right wedges calculator pseudo-code description:
    WBtr[x][y] = b[x][y] + Ftop * WBtr[x][y-1] +
         Ftop_right * WBtr[x+1][y-1] -
         Ftop * Ftop_right * WBtr[x+1][y-2]
    WBbr[x][y] = b[x][y] + Ftop_right * WBbr[x+1][y-1] +
         Fright * WBbr[x+1][y] -
         Ftop_right * Fright * WBbr[x+2][y-1]
    WWtr[x][y] = w[x][y] + Ftop * WWtr[x][y-1] +
         Ftop_right * WWtr[x+1][y-1] -
         Ftop * Ftop_right * WWtr[x+1][y-2]

APPENDIX E-continued

WWbr[x][y] = w[x][y] + Ftop_right * WWbr[x+1][y−1] +
    Fright * WWbr[x+1][y] −
    Ftop_right * Fright * WWbr[x+2][y−1]

What is claimed is:

1. A method of processing an image, said image comprising a plurality of pixels, said method comprising the steps of:
   (a) determining an output value of a first current pixel, which is not at an edge of the image, using a first influence value for a first current pixel which equals a first sum, over a first set of pixels, of the product of a pixel weight value and a corresponding pixel value, where the pixel weight value is substantially equal to a weight factor raised to the power of the distance of the pixel from the first current pixel; and
   (b) determining an output value for a second current pixel, using a second influence value determined as either:
      (i) a product of a weight value reducing factor and the first influence value, or
      (ii) a product of a weight value reducing factor and the sum of the first influence value and a value for the first current pixel,
      so that the second influence value equals a second sum over a second set of pixels of the product of a pixel weight value and a corresponding pixel value, where each pixel weight value is substantially equal to a weight factor raised to the power of the distance of the pixel from the second current pixel.

2. A method according to claim 1, wherein said processing determines an output value for a single current pixel.

3. A method according to claim 1, wherein pixels of said image are processed in display order, and each pixel of said set precedes said current pixel.

4. A method according to claim 3, wherein said sets comprise all pixels of said image that precede said current pixel.

5. A method according to claim 3, wherein said sets comprises a plurality of groups of pixels, each said group extending substantially radially from said current pixel.

6. A method according to claim 5, wherein the number of said groups is two or more.

7. A method according to claim 6, wherein the number of said groups is three or four and said method steps also comprise halftoning of at least said second current pixel.

8. A method according to claim 7, wherein steps (a) and (b) comprise the sub-steps of:
   (1) determining an under result and an over result for a plurality of previously halftoned pixels of said image; and
   (2) determining using the under result and the over result of previously halftoned pixels an under result repulsive measure and an over result repulsive measure for the current pixel;
   and said halftoning comprises
   (3) comparing the under result repulsive measure to the over result repulsive measure and assigning a first output state value as the output value for the current pixel in the event that the under result repulsive measure is greater than the over result repulsive measure, and
   (4) assigning a second output state value as the output value for said current pixel in the event that the over result repulsive measure is greater than the under result repulsive measure.

9. A method according to claim 8, wherein the under result is determined by assigning to it a value of zero if the output value of the pixel is greater than or equal to the input value and assigned a value equal to the input value less the output value if the output value of the pixel is less than the input value, and wherein the over result is determined by assigning to it a value of zero if the output value is less than or equal to the input value and assigned a value equal to the output value less the input value if the output of the current pixel is greater than the input value.

10. A method according to claim 8, wherein the first output state value is the least output state value which is greater than or equal to the input value of the current pixel, and said second output state value is the greatest output state value which is less than or equal to the input value of the current pixel.

11. A method according to claim 8, wherein the under result repulsive measure is determined from the under result of at least one of the previously halftoned pixels and an under result for the current pixel when the current pixel is halftoned to the second output state value, and the over result repulsive measure is determined from the over result of at least one of the previously halftoned pixels and an over result for the current pixel when the current pixel is halftoned to the first output state value.

12. A method according to claim 8, wherein said image is any one image of a series of images.

13. A method according to claim 8, wherein the under result repulsive measure and over result repulsive measure are determined utilizing a set of geometrically reducing weight values.

14. A method according to claim 8, wherein the under result and the over result are each determined for each previously halftoned pixel of said image.

15. A method according to claim 8, wherein said pixels are halftoned in raster-display order and said previously halftoned pixels are divided into at least two groups and sub-step (2) comprises determining repulsive measures for each of said groups, said repulsive measures being summed prior to sub-step (3).

16. A method according to claim 15, wherein said image comprises (y) scanlines and (x) pixels per scanline, and said current pixel has a location (i,j) (where $1 \leq i \leq x$, $1 \leq j \leq y$) in said image, and said previously halftoned pixels are divided into two groups, a first one of said groups being bounded by pixels at locations (1,1), (i−1,1) (1,j) and (i−1,j), and the second one of said groups being bounded by pixels at locations (i, 1), (x, 1), (i,j−1) and (x,j−1).

17. A method according to claim 16, wherein each of said groups is divided into a plurality of subgroups each extending substantially radially from said current pixel, said repulsive measures being determined for each of said sub-groups.

18. A method according to claim 16, wherein pixels in a current scanline of said image are halftoned by at least one forward pass proceeding in the raster scan direction, and at least one reverse pass proceeding in a reverse raster scan direction, the forward pass determining the contribution to the repulsive measures of pixels in the current scanline by the first one of said groups, and the reverse passes determining the contribution to the repulsive measures of pixels in the next scanline by the second one of said groups.

19. A method according to claim 16, wherein pixels in a current scanline of said image are halftoned by at least one pass proceeding either left to right or right to left but in the opposite direction to a pass of the previous scanline.

20. A method according to claim 9, wherein the under and over results are determined using an error measure between the output value and the input value that preserves a ratio of error between the under result and the over result.

21. A method according to claim 1, wherein said current pixel has more than one color component.

22. A method of halftoning an image, said image comprising a plurality of pixels each having an input value and in assignable output value that can take on one of at least two output values, said method comprising the steps of:

(a) determining an output value of a first current pixel, which is not at an edge of the image, using a first influence value for a first current pixel which equals a first sum, over a first set of pixels, of the product of a pixel weight value and a corresponding pixel error value, where the pixel weight value is substantially equal to a weight factor raised to the power of the distance of the pixel from the first current pixel; and (b) for the purpose of determining an output value for a second current pixel, calculating a second influence value for the second current pixel
  (i) as a product of a weight value reducing factor and the first influence value, or
  (ii) as a product of a weight value reducing factor and the sum of the first influence value and an error value for the first current pixel,
so that the second influence value equals a second sum over a second set of pixels of the product of a pixel weight value and a corresponding pixel error value, where the pixel weight value is substantially equal to a weight factor raised to the power of the distance of the pixel of the second set from the second current pixel.

23. A method according to claim 22, wherein the second current pixel immediately follows the first current pixel in an image scanning direction and said weight value reducing factor corresponds to said weight factor.

24. A method according to claim 22, wherein the second set of pixels corresponds to the first set of pixels and step (b)(i) is used.

25. A method according to claim 22, comprising the further step of determining a halftone output value for each of the first and second current pixels by adding the corresponding influence value to the corresponding pixel input value and assigning one of said output values thereto, and deriving therefrom the corresponding pixel error value.

26. A method according to claim 22, wherein the step of determining the output value of at least one current pixel includes the further steps of:

(c) calculating a cost measure value for each possible output value of the current pixel using at least one sum, over the set of pixels, of the product of a pixel weight value and a pixel error value;

(d) comparing the cost measure values; and (e) assigning that output value with the least cost measure value as the output value for the current pixel.

27. A method according to claim 22, wherein the step of determining the output value of at least one current pixel includes the further steps of:

(c) calculating a cost measure value for each possible output value of the current pixel using at least one sum over a set of pixels, of the product of a pixel weight value and a pixel error value, where the pixel weight value is substantially equal to a weight factor raised to the power of the distance of the pixel from the current pixel;

(d) determining an alternative output value of the current pixel by an alternative halftoning method:

(e) assigning the alternative output value as the output value for the current pixel if the cost measure value for the alternative output value is less than the maximum cost measure value for any output value for the current pixel plus a threshold value and otherwise assigning that output value with the least cost measure value as the output value for the current pixel.

28. A method according to claim 27, wherein said alternative halftoning method comprises dithering.

29. A method according to claim 27, wherein the alternative halftoning method generates an output value for a pixel by retrieving a value from a table, using the pixel input value and pixel co-ordinates to prepare values for indexing the table.

30. A method according to claim 22, wherein said first sum is a sum over a set of pixels where the displacement of each pixel of the set of pixels from the first current pixel is represented as a scalar value multiplied by a vector with the weight value for each pixel being a weight factor raised to the power of the scalar value.

31. A method according to claim 22, wherein said first sum is a sum over a set of pixels where the displacement of each pixel of the set of pixels from the first current pixel is represented as a sum of a first scalar value multiplied by one vector with a second scalar value multiplied by another vector and the weight value for each pixel being a product of one weight factor raised to the power of the first scalar value with another weight factor raised to the power of the second scalar value.

32. A method according to claim 26 or 27, wherein the cost measure corresponding to each output value of the current pixel is the absolute value of the sum of at least two terms, the first term being a weight value multiplied by an error value for the current pixel and the second value being a weighted sum of error values of previously processed pixels.

33. A method according to claim 26 or 27, wherein the cost measure corresponding to each output value of the current pixel includes the product of an error value for the current pixel with a weighted sum of error values of previously processed pixels.

34. A method according to claim 26 or 27, wherein the cost measure corresponding to each output value of the current pixel includes contributions of weighted error values of pixels in the vicinity of the current pixel which do not satisfy the condition that the weight value is approximately equal to a weight factor raised to the power of the distance of the pixel from the current pixel.

35. A method according to claim 22, further comprising the step of preprocessing said current pixel using an inverse transform to correct for non-linearity in the halftoning method.

36. A method according to claim 22 comprising the steps of:

(i) assigning a predetermined value to an output value of the current pixel, (ii) determining a repulsive measure between the current pixel and a plurality of previously halftoned pixels of the current image;

(iii) comparing the repulsive measure to the minimum repulsive measure achievable for the current pixel in combination with a threshold value; and (iv) retaining the predetermined value as the output value of said current pixel if the repulsive measure is less than the sum of the minimum repulsive measure and the threshold value.

37. A method according to claim 36, wherein the predetermined value is assigned a value equal to the output value of a corresponding pixel of a previous frame of a sequence of images.

38. A method according to claim 37, wherein the predetermined value is assigned a value equal to an output value to said current pixel determined by a process of dithering an input value of said pixel.

39. A method according to claim 36, wherein the predetermined value is assigned a value equal to an output value of said current pixel determined by selection from a dot pattern indexed by the current pixel input value.

40. A method according to claim 39, wherein said dot patterns are at least partly uncorrelated.

41. A method according to claim 40, wherein said input dot pattern is optimized by simulated annealing.

42. A method according to claim 36, wherein the predetermined value is determined by another halftoning process.

43. A method according to claim 36, wherein the predetermined value is assigned a value equal to an output value of said current pixel determined by a process of dithering an input value of said current pixel, and wherein the dither matrix used for dithering is selected from a set of dither matrices using a function of the nearby pixel input values.

44. A method according to claim 38, wherein said function comprises including but not limited to indexing a dither matrix by the current pixel input value.

45. A method according to claim 38, wherein said dithering is performed using one of an inverse dither matrix or a displaced dither matrix.

46. A method according to claim 36, wherein said minimum repulsive measure is an over repulsive measure in the event that the predetermined value is less than an input value of the current pixel.

47. A method according to claim 36, wherein said minimum repulsive measure is an under repulsive measure in the event that the predetermined value is greater than an input value of the current pixel.

48. A method according to claim 22, wherein said current pixel has more than one color component.

49. A method of halftoning an image, said image comprising a plurality of pixels each having an input value and an assignable output value that can take on one of at least two output values, said method comprising the steps of:
 (a) determining an output value of a first current pixel, which is not at an edge of the image, using a set of two or more first influence values for a first current pixel where each first influence value equals a sum, over a first set of pixels, of the product of a pixel weight value and a corresponding pixel error value, where the pixel weight value is substantially equal to a weight factor raised to the power of the distance of the pixel from the first current pixel; and
 (b) for the purpose of determining an output value for a second current pixel, calculating a set of two or more second influence values for the second current pixel where each second influence value is calculated
  (i) as a product of a weight value reducing factor and one of the first influence values, or
  (ii) as a product of a weight value reducing factor and the sum of one of the influences value and an error value for the first current pixel,
 so that each second influence value equals a sum over a second set of pixels of the product of a pixel weight value and a corresponding pixel error value, where the pixel weight value is substantially equal to a weight factor raised to the power of the distance of the pixel of the second set from the second current pixel.

50. A method according to claim 49, wherein the second current pixel immediately follows the first current pixel in an image scanning direction and said weight value reducing factor corresponds to said weight factor.

51. A method according to claim 49, wherein the second set of pixels corresponds to the first set of pixels and step (b)(i) is used.

52. A method according to claim 49 comprising the further step of determining a halftone output value for each of the first and second current pixels by adding the corresponding influence value to the corresponding pixel input value and assigning one of said output values thereto, and deriving therefrom the corresponding pixel error value.

53. A method according to claim 49, wherein the step of determining the output value of at least one current pixel includes the further steps of:
 (c) calculating a cost measure value for each possible output value of the current pixel using at least one sum, over the set of pixels, of the product of a pixel weight value and a pixel error value;
 (d) comparing the cost measure values; and
 (e) assigning that output value with the least cost measure value as the output value for the current pixel.

54. A method according to claim 49, wherein the step of determining the output value of at least one current pixel includes the further steps of:
 (c) calculating a cost measure value for each possible output value of the current pixel using at least one sum, over a set of pixels, of the product of a pixel weight value and a pixel error value, where the pixel weight value is substantially equal to a weight factor raised to the power of the distance of the pixel from the current pixel;
 (d) determining an alternative output value of the current pixel by an alternative halftoning method;
 (e) assigning the alternative output value as the output value for the current pixel if the cost measure value for the alternative output value is less than the minimum cost measure value for any output value for the current pixel plus a threshold value and otherwise assigning that output value with the least cost measure value as the output value for the current pixel.

55. A method according to claim 54, wherein said alternative halftoning method comprises dithering.

56. A method according to claim 54, wherein the alternative halftoning method generates an output value for a pixel by retrieving a value from a table, using the pixel input value and pixel co-ordinates to prepare values for indexing the table.

57. A method according to claim 49, wherein said first sum is a sum over a set of pixels where the displacement of each pixel of the set of pixels from the first current pixel is represented as a scalar value multiplied by a vector with the weight value for each pixel being a weight factor raised to the power of the scalar value.

58. A method according to claim 49, wherein said first sum is a sum over a set of pixels where the displacement of each pixel of the set of pixels from the first current pixel is represented as a sum of a first scalar value multiplied by one vector with a second scalar value multiplied by another vector and the weight value for each pixel being a product of one weight factor raised to the power of the first scalar value with another weight factor raised to the power of the second scalar value.

59. A method according to claim 53 or 54, wherein the cost measure corresponding to each output value of the current pixel is the absolute value of the sum of at least two terms, the first term being a weight value multiplied by an error value for the current pixel and the second value being a weighted sum of error values of previously processed pixels.

60. A method according to claim 53 or 54, wherein the cost measure corresponding to each output value of the current pixel includes the product of an error value for the current pixel with a weighted sum of error values of previously processed pixels.

61. A method according to claim 53 or 54, wherein the cost measure corresponding to each output value of the current pixel includes contributions of weighted error values of pixels in the vicinity of the current pixel which do not satisfy the condition that the weight value is approximately equal to a weight factor raised to the power of the distance of the pixel from the current pixel.

62. A method according to claim 49, wherein said current pixel has more than one color component.

63. An apparatus for processing an image, said image comprising a plurality of pixels each having an input value, said apparatus comprising:
   (a) means for determining an output value of a first current pixel, which is not at an edge of the image, using a first influence value for a first current pixel determined from a first function, over a first set of pixels, of pixel weight values, where each pixel weight value is substantially equal to a weight factor raised to the power of the distance of the pixel from the first current pixel; and
   (b) means for determining an output value for a second current pixel using a second influence value for the second current pixel determined from a second function of a weight value reducing factor and the first influence value,
   so that the second influence value is related to a third function including a pixel weight value, where the pixel weight value is substantially equal to a weight factor raised to the power of the distance of the pixel of the second set from the second current pixel.

64. Apparatus for halftoning an image, said image comprising a plurality of pixels each having an input value and an assignable output value that can take on one of at least two output values, said apparatus comprising:
   (a) means for determining an output value of a first current pixel, which is not at an edge of the image, using a first influence value for a first current pixel which equals a first sum, over a first set of pixels, of the product of a pixel weight value and a corresponding pixel error value, where the pixel weight value is substantially equal to a weight factor raised to the power of the distance of the pixel from the first current pixel; and
   (b) means for determining an output value for a second current pixel, by calculating a second influence value for the second current pixel
      (i) as a product of a weight value reducing factor and the first influence value, or
      (ii) as a product of a weight value reducing factor and the sum of the first influence value and an error value for the first current pixel,
      so that the second influence value equals a second sum over a second set of pixels of the product of a pixel weight value and a corresponding pixel error value, where the pixel weight value is substantially equal to a weight factor raised to the power of the distance of the pixel of the second set from the second current pixel.

65. Apparatus for halftoning an image, said image comprising a plurality of pixels each having an input value and an assignable output value that can take on one of at least two output values, said apparatus comprising:
   (a) means for determining an output value of a first current pixel, which is not at an edge of the image, using a set of two or more first influence values for a first current pixel where each first influence value equals a sum, over a first set of pixels, of the product of a pixel weight value and a corresponding pixel error value, where the pixel weight value is substantially equal to a weight factor raised to the power of the distance of the pixel from the first current pixel; and
   (b) means for determining an output value for a second current pixel, by calculating a set of two or more second influence values for the second current pixel where each second influence value is calculated
      (i) as a product of a weight value reducing factor and one of the first influence values, or
      (ii) as a product of a weight value reducing factor and the sum of one of the influences value and an error value for the first current pixel,
      so that each second influence value equals a sum over a second set of pixels of the product of a pixel weight value and a corresponding pixel error value, where the pixel weight value is substantially equal to a weight factor raised to the power of the distance of the pixel of the second set from the second current pixel.

66. A computer software system comprising a series of instructions, wherein said instructions comprise a plurality of process modules for halftoning an image, said image comprising a plurality pixels each having an input value and an assignable output value that can take on one of at least two output values, said modules implementing the method steps of claim 1.

67. A computer software system comprising a series of instructions, wherein said instructions comprise a plurality of process modules for halftoning an image, said image comprising a plurality pixels each having an input value and an assignable output value that can take on one of at least two output values, said modules implementing the method steps of claim 22.

68. A computer software system comprising a series of instructions, wherein said instructions comprise a plurality of process modules for halftoning an image, said image comprising a plurality pixels each having an input value and an assignable output value that can take on one of at least two output values, said modules implementing the method steps of claim 49.

69. A computer software system according to claim 66, 67 or 68, wherein said instructions are configured for operation via a computer readable medium, said medium being one of a memory device, a computer, and a computer network.

70. A computer system comprising:
   input means for receiving at least one image;
   processing means for processing pixels of said image using a set of geometrically reducing set of weight factors to obtain a processed value of at least one current pixel of said image; and
   means for reproducing a display value of said current pixel related to said processed value, wherein said processing means comprises an apparatus according to claim 63, 64 or 65.

71. A computer system according to claim 70, wherein said means for reproducing comprises a discrete level display for displaying the image(s) output from said processing means.

72. An image processor comprising:

input means for receiving an image;

means for manipulating pixel value of said image using a geometrically reducing set of weight factors; and output means for outputting manipulated pixel values, wherein said means for manipulating comprises an apparatus according to claim 63, 64 or 65.

73. An image processor according to claim 72, where an input pixel $in_{x,y}$ is provided and said means for manipulating comprises:

first means for determining $$in_{x,y}=invht[in\_orig_{x,y}]$$

second means for determining $$error\_processed_{x,y}=X*L_{x-1,y}+X*Z*W_{x-2,y-1}+Z*D\_left_{x-1,y-1}+X*Q_{x,y-1}+Z*(\Sigma_{i<=5}X^{i}*D\_right_{x+i,y-1})$$

third means for determining $$abs\_filtered\_error\_255_{x,y}=abs(error\_processed_{x,y}+in_{x,y}-255)$$

$$abs\_filtered\_error\_0_{x,y}=abs(error\_processed_{x,y}+in_{x,y})$$

fourth means for determining (if $abs\_filtered\_error\_255_{x,y}$) is greater than ($abs\_filtered\_error\_0_{x,y}$)

then (i) $out_{x,y}=255$ and $e_{x,y}=in_{x,y}-255$ or (ii) $out_{x,y} \times 0$ and $e_{x,y}=in_{x,y}$ fifth means for determining $$L_{x,y}=e_{x,y}+X*L_{x-1,y}$$

$$W_{x,y-1}=D\_left_{x,y-1}+X*W_{x-1,y-1}$$

$$D\_left_{x,y}=e_{x,y}+Z*D\_left_{x-1,y-1}$$

$$Q_{x,y}=e_{x,y}+Z*D\_left_{x-1,y-1}+X*Q_{x,y-1}+Z*D\_right_{x+1,y-1}$$

$$D\_right_{x,y}=e_{x,y}+Z*D\_right_{x+1,y-1}$$

sixth means coupled as a second input to said second means providing a data store for each pixel of current line including $D\_left_{x,y-1}$, $Q_{x,y-1}$, $D\_right_{x,y-1}$, and seventh means coupled as a third input to said second means providing a data store for the current pixel $L_{x-1,y}$ and $W_{x-1,y-1}$.

74. An image processor according to claim 72, further comprising:

means for determining repulsive measure data from repulsive forces between said pixel data and a plurality of previously halftoned pixels; and pixel calculator means for determining halftone output data of said image processor from said pixel data and said repulsive measure data.

75. An image processor according to claim 74, wherein said pixel calculator means determines pixel excess values for a current pixel of said image, and said means for determining comprises:

first pixel group calculator means for determining first pixel group excess values from said pixel excess values and previously calculated first pixel group excess values;

first group memory means for storing said first pixel group excess values and supplying said previously calculated first pixel group excess values to said first pixel group calculator means and to said pixel calculator means;

a pixel result memory means for storing said pixel excess values;

second pixel group calculator means for determining second pixel group excess values from said pixel excess values output from said pixel result memory means and from previously calculated second pixel group excess values: and second group memory means for storing said second group excess values and supplying said previously calculated second group excess values to said second pixel group calculator means and to said pixel calculator means, said previously determined first group and second group excess values collectively comprising said repulsive measure data.

76. An image processor according to claim 75, wherein said pixel result memory means, said first group memory means and said second group memory means each comprise serial memory.

77. An image processor according to claim 76, wherein each said serial memoryis operable to alter a direction of data movement therethrough.

78. An image processor according to claim 77, wherein said pixel groups comprise respective portions of all previously halftoned pixels in said image.

79. An image processor according to claim 78, wherein said pixel groups comprises left and right wedges of said previously halftoned pixels and, for a current pixel i[x][y] of said image:

inputs of said pixel calculator means comprise said current pixel i[x][y], left wedge excess values WBbl[x−1][y], WBtl[x−1][y−1], WWbl[x−1][y], and WWtl[x−1][y−1) output from the first group memory means, right wedge excess values WBtr[x][y−1], WBbr[x+1][y−1], WWtr[x][y−1], and WWbr[x+1][y−1] output from the second group memory means, said pixel calculator means outputs a pixel halftone output value o[x][y], pixel excess black value b[x][y], and a pixel excess white value w[x][y] determined by:

$b=i[x][y]$;

$w=255-i[x][y]$;

$Fb=Fleft*WBbl[x-1][y]+Ftop\_left*WBtl[x-1][y-1]+Ftop*WBtr[x][y-1]+Ftop\_right*WBbr[x+1][y-1]$;

$Fb=Fb*b$;

$Fw=Fleft*WWbl[x-1][y]+Ftop\_left*WWtl[x-1][y-1]+Ftop*WWtr[x][y-1]+Ftop\_right*WWbr[x+1][y-1]$;

$Fw=Fw*w$;

if $(Fb>=Fw)$ then $(o[x][y]=255, b[x][y]=0$ and $w[x][y]=w)$ or $(o[x][y]=0, b[x][y]=b$ and $w[x][y]=0)$;

inputs of the first (left) pixel group calculator means comprise the pixel excess black value b[x][y], the pixel excess white value w[x][y] both output from the pixel calculator means, and both left wedge excess black values WBbl[x−1][y], WBbl[x−1][y−1], WBbl[x−2][y−1], WBtl[x−1][y−1], WBtl[x][y−1], and WBtl[x−1][y−2] and left wedge excess white values WWbl[x−1]

[y], WWbl[x−1][y−1], WWbl[x−2][y−1], WWtl[x−1][y−1], WWtl[x][y−1], and WWtl[x−1][y−2] output from said first group memory means, and output of said first pixel group calculator means comprise left wedge excess black values WBbl[x][y] and WBtl[x][y], and left wedge excess white values WWbl[x][y] and WWtl[x][y], given by:

$$WBbl[x][y]=b[x][y]+Fleft*WBbl[x-1][y]+Ftop\_left*WBbl[x-1][y-1]-Fleft*top\_left*WBbl[x-2][y-1];$$

$$WBtl[x][y]=b[x][y]+Ftop\_left*WBtl[x-1][y-1]+Ftop*WBtl[x][y-1]-Ftop\_left*Ftop*WBtl[x-1][y-2];$$

$$WWbl[x][y]=w[x][y]+Fleft*WWbl[x-1][y]+Ftop\_left*WWbl[x-1][y-1]-Fleft*top\_left*WWbl[x-2][y-1];$$

$$WWtl[x][y]=w[x][y]+Ftop\_left*WWtl[x-1][y-1]+Ftop*WWtl[x][y-1]-Ftop\_left*Ftop*WWtl[x-1][y-2]; \text{ and}$$

inputs of said second pixel group (right) calculator means comprise the pixel excess black value b[x][y], the pixel excess white value w[x][y], right wedge excess black values WBtr[x][y−1], WBtr[x+1][y−1], WBtr[x+1][y−2], WBbr[x+1][y−1], WBbr[x+1][y], and WBbr[x+2][y−1] and right wedge excess white values WWtr[x][y−1], WWtr[x+1][y−1], WWtr[x+1][y−2], WWbr[x+1][y−1], WWbr[x+1][y], and WWbr[x+2][y−1] output from the second group memory means, wherein outputs of said second pixel group (right) calculator means comprise right wedge excess black values WBtr[x][y] and WBbr[x][y], right wedge excess white values WWtr[x][y] and WWbr[x][y] given by:

$$WBtr[x][y]=b[x][y]+Ftop*WBtr[x][y-1]+Ftop\_right*WBtr[x+1][y-1]-Ftop*Ftop\_right*WBtr[x+1][y-2];$$

$$WBbr[x][y]=b[x][y]+Ftop\_right*WBbr[x+1][y-1]+Fright*WBbr[x+1][y]-Ftop\_right*Fright*WBbr[x+2][y-1];$$

$$WWtr[x][y]=w[x][y]+Ftop*WWtr[x][y-1]+Ftop\_right*WWtr[x+1][y-1]-Ftop*Ftop\_right*WWtr[x+1][y-2];$$

$$WWbr[x][y]=w[x][y]+Ftop\_right*WWbr[x+1][y-1]+Fright*WWbr[x+1][y]-Ftop\_right*Fright*WWbr[x+2][y-1].$$

\* \* \* \* \*

UNITED STATES PATENT AND TRADEMARK OFFICE
CERTIFICATE OF CORRECTION

PATENT NO. : 6,476,934 B1
DATED : November 5, 2002
INVENTOR(S) : Peter W.M. Ilbery et al.

It is certified that error appears in the above-identified patent and that said Letters Patent is hereby corrected as shown below:

Column 3,
Line 47, "raised w" should read -- raised to --
Line 57, "pixel:" should read -- pixel --.

Column 6,
Line 65, "hew" should read -- the --.

Column 8,
Line 7, "filed" should read -- field --.

Column 9,
Line 65, "error_contribution_of_processed$_{pixelscurrent\_pixel}$" should read
-- error_contribution_of_processed_pixels$_{current\_pixel}$ --.

Column 11,
Line 28, "Z=⅜/g" should read -- Z=⅜ --.

Column 12,
Line 13, "provided" should read -- provide --.
Line 21, "Z=⅜/g)" should read -- Z=⅜) --.

Column 16,
Line 22, "for the." should read -- for the --.

Column 20,
Line 54, "is blue" should read -- blue --.

Column 21,
Line 49, "etermined" should read -- determined --.
Line 67, "saline" should read -- same --.

Column 28,
Line 17, "arc," should read -- art, --.

Column 43,
Line 42, "comprises" should read -- comprise --.

Column 45,
Line 62, "sum" should read -- sum, --.

UNITED STATES PATENT AND TRADEMARK OFFICE
CERTIFICATE OF CORRECTION

PATENT NO. : 6,476,934 B1
DATED : November 5, 2002
INVENTOR(S) : Peter W.M. Ilbery et al.

It is certified that error appears in the above-identified patent and that said Letters Patent is hereby corrected as shown below:

Column 46,
Line 2, "method:" should read -- method; --.

Column 47,
Line 28, "comprises including but not limited to" should read -- comprises, including but not limited to, --.

Column 50,
Lines 38, 44 and 51, "plurality" should read -- plurality of --.

Column 51,
Line 36, "$out_{x,y} \times 0$" should read -- $out_{x,y}=0$ --.

Column 52,
Line 27, "memoryis" should read -- memory is --.
Line 39, "[y-1)" should read -- [y-1] --.

Signed and Sealed this

Second Day of September, 2003

JAMES E. ROGAN
*Director of the United States Patent and Trademark Office*